US011909094B2

(12) United States Patent
Yoo et al.

(10) Patent No.: US 11,909,094 B2
(45) Date of Patent: Feb. 20, 2024

(54) CLAMPING APPARATUS FOR ANTENNA

(71) Applicant: KMW INC., Hwaseong-si (KR)

(72) Inventors: Chang Woo Yoo, Hwaseong-si (KR); Jin Soo Yeo, Hwaseong-si (KR); In-Ho Kim, Yongin-si (KR)

(73) Assignee: KMW INC., Hwaseong-si (KR)

( * ) Notice: Subject to any disclaimer, the term of this patent is extended or adjusted under 35 U.S.C. 154(b) by 330 days.

(21) Appl. No.: 17/474,072

(22) Filed: Sep. 14, 2021

(65) Prior Publication Data

US 2021/0408661 A1 Dec. 30, 2021

Related U.S. Application Data

(63) Continuation of application No. PCT/KR2020/003723, filed on Mar. 18, 2020.

(30) Foreign Application Priority Data

Mar. 18, 2019 (KR) ........................ 10-2019-0030768
Oct. 30, 2019 (KR) ........................ 10-2019-0136082

(51) Int. Cl.
*H01Q 1/12* (2006.01)

(52) U.S. Cl.
CPC ........... *H01Q 1/125* (2013.01); *H01Q 1/1228* (2013.01)

(58) Field of Classification Search
CPC .... H01Q 1/125; H01Q 1/1228; H01Q 1/1242; H01Q 1/246; H01Q 3/08; H01Q 1/1207
See application file for complete search history.

(56) References Cited

U.S. PATENT DOCUMENTS 6,283,425 B1 * 9/2001 Liljevik ................. F16M 11/10 403/399
6,538,613 B1 * 3/2003 Pursiheimo .............. H01Q 3/08 342/359
(Continued)

FOREIGN PATENT DOCUMENTS

KR 10-2009-0017933 A 2/2009
KR 20-2011-0001413 U 2/2011
(Continued)

OTHER PUBLICATIONS

Australian Office Action dated Jul. 19, 2022 for Australian Application No. 2020240972.
(Continued)

*Primary Examiner* — David E Lotter
(74) *Attorney, Agent, or Firm* — Insight Law Group, PLLC; Seung Lee

(57) ABSTRACT

The present invention relates to a clamping apparatus for an antenna. Particularly, the clamping apparatus comprises: an arm unit which is coupled to a support pole and has a mounting space formed in a tip portion thereof and open in a longitudinal direction; a rotation unit which is detachably mounted in the mounting space of the arm unit and has a tip portion coupled to be rotatable predetermined angle in the left and right directions with respect to a hinge point in the mounting space; a tilting unit which is coupled to the tip portion of the rotation unit so as to be tiltable in the up and down directions and mediates the coupling of an antenna device; and a mounting guide unit which is provided in the rotation unit, and is elastically pressed and then temporarily fixed to the hinge point of the mounting space when the rotation unit is mounted in the mounting space of the arm unit. Thus, the present invention provides the advantages of removing spatial limitations for a plurality of antenna
(Continued)

devices with respect to the support pole, and improving workability.

26 Claims, 18 Drawing Sheets

(56) References Cited

U.S. PATENT DOCUMENTS

| | | | | |
|---|---|---|---|---|
| 2012/0234992 | A1* | 9/2012 | Vanover | H01Q 1/1207 248/201 |
| 2014/0118213 | A1 | 5/2014 | Blalock et al. | |
| 2021/0408662 | A1* | 12/2021 | Yoo | H01Q 3/08 |
| 2022/0029270 | A1* | 1/2022 | Yoo | F16B 2/065 |
| 2022/0037758 | A1* | 2/2022 | Kim | H01Q 3/08 |
| 2022/0190473 | A1* | 6/2022 | Kim | H01Q 3/08 |
| 2022/0238982 | A1* | 7/2022 | Kim | H01Q 1/1228 |

FOREIGN PATENT DOCUMENTS

| | | | |
|---|---|---|---|
| KR | 10-2013-0008946 | A | 1/2013 |
| KR | 10-1719270 | B1 | 3/2017 |

OTHER PUBLICATIONS

International Search Report dated Jul. 1, 2020 for International Application No. PCT/KR2020/003723 and its English translation.

Indian Office Action dated Apr. 4, 2022 for Indian Application No. 202117046890.

* cited by examiner

CLAMPING APPARATUS FOR ANTENNA

CROSS-REFERENCE TO RELATED APPLICATIONS

This application is a continuation application of International Application No. PCT/KR2020/003723, filed Mar. 18, 2020, which claims the benefit of Korean Patent Application Nos. 10-2019-0030768, filed Mar. 18, 2019, and 10-2019-0136082, filed Oct. 30, 2019, in the Korean Intellectual Property Office, the disclosures of which are incorporated herein in their entirety by reference.

TECHNICAL FIELD

The present disclosure relates to a clamping apparatus for an antenna, and more particularly, to a clamping apparatus for an antenna, in which an antenna device can be efficiently disposed in a compact installation space as well as a direction of the antenna device is easily adjusted.

BACKGROUND ART

Wireless communication technology, for example, multiple-input multiple-output (MIMO) technology is technology that remarkably increases a data transmission capacity using multiple antennas, and is a spatial multiplexing technique for transmitting different data through each transmitting antenna at a transmitter and for sorting the transmitted data through adequate signal processing at a receiver.

Therefore, by simultaneously increasing the number of transmitting antennas and the number of receiving antennas, a channel capacity is increased, and more data can be transmitted. For example, if the number of antennas is increased to ten, a channel capacity of about ten times is secured using the same frequency band compared to a current single antenna system.

In 4G LTE-Advanced, antennas are used up to eight, and products in which 64 or 128 antennas are mounted in a pre-5G step are developed at present. It is expected that base station equipment having far more antennas will be used in 5G, which is referred to as Massive MIMO technology. A current cell operation is of two dimensions, whereas, if the Massive MIMO technology is introduced, 3D-Beamforming is possible, thus being also referred to as full dimension (FD)-MIMO.

In the Massive MIMO technology, as the number of antennas (ANTS) increases, the number of transmitters and the number of filters are increased together. However, due to lease expenses of an installation space or spatial limitations, RF elements (antenna/filter/power amplifier/transceiver, etc.) are actually made small, light, and inexpensive. Massive MIMO requires a high output for coverage expansion, and power consumption and a heating value caused by the high output act as negative factors in reducing weight and a size.

Especially, when a MIMO antenna, in which modules implemented by RF elements and digital elements are coupled in a layered structure, is installed in a restricted space, the necessity for compact and miniature design of a plurality of layers constituting the MIMO antenna in order to maximize installation easiness or spatial applicability is rising, and the necessity for free direction adjustment of an antenna device installed on one support pole is strongly requested.

DISCLOSURE

Technical Problem

An object of the present disclosure is to provide a clamping apparatus for an antenna which can increase a degree of freedom of installation with respect to a support pole having many spatial limitations and improve workability.

Technical objects of the present disclosure are not limited to the aforementioned technical object, and other technical objects not described above may be evidently understood by those skilled in the art from the following description.

Technical Solution

An embodiment of a clamping apparatus for an antenna according to the present disclosure includes: an arm unit that is coupled to a support pole and has a mounting space formed a tip portion thereof so as to open in a longitudinal direction; a rotation unit that is detachably mounted in the mounting space of the arm unit and has a tip portion coupled to be rotatable about a hinge point in the mounting space at a predetermined angle in a left-right direction; a tilting unit that is coupled to the tip portion of the rotation unit so as to be tiltable in an up-down direction and configured to mediate coupling of an antenna device; and mounting guide unit that is provided to the rotation unit, and is elastically pressed, and then is temporarily fixed to the hinge point in the mounting space when the rotation unit is mounted in the mounting space of the arm unit.

Here, the mounting guide unit may include a guide tube that is provided such that an outer end thereof is protrudable outward from a lower hinge fastening hole, which is provided such that a part of the rotation unit which corresponds to the hinge point in the mounting space is recessed, at a predetermined length; and an elastic body that elastically supports the guide tube in an outward direction of the rotation unit.

Moreover, an outer end of the guide tube may protrude at a length at which the guide tube is inserted into and caught in a hinge hole formed at the hinge point in the mounting space of the arm unit Moreover, a lower rotating pin may pass through the hinge point at an outer side of the arm unit and be inserted into and installed in the guide tube.

Moreover, the mounting guide unit may further include an anti-separation nut that is screwed to an inner circumferential surface of the lower hinge fastening hole so as to prevent outward separation of the guide tube.

Moreover, the anti-separation nut may be located between an outer circumferential surface of the guide tube and the inner circumferential surface of the lower hinge fastening hole, and a hanging rib hung on the anti-separation nut may be formed on the outer circumferential surface of the guide tube so as to extend outward in a circumferential direction.

Moreover, the arm unit may include: an outer mounting block that is disposed to come into close contact with one side of an outer circumferential surface of the support pole; an inner mounting block that is disposed to come into close contact with the other side of the outer circumferential surface of the support pole and is fixed with the outer mounting block by at least one or more fixing bolts; and a clamp arm that extends from the inner mounting block at a predetermined length in a direction orthogonal to the support pole and constitutes a tip portion to which the mounting space is provided.

Moreover, at least one or more reinforcement ribs may be formed at a connection part between the inner mounting block and the clamp arm.

Moreover, the clamp arm may be manufactured at multiple preset lengths so as to be installable in a different separation distance from the support pole depending on another antenna device, which is installed adjacent to the antenna device coupled to the and surrounding interference bodies.

Moreover, the clamping apparatus for an antenna may further include a reinforcement wire unit having a connecting wire, one end of which is fixed to a part of the support pole which corresponds to an upper portion of the arm unit, and the other end of which is fixed to the clamp arm of the arm unit.

Moreover, the reinforcement wire unit may be selectively installed in consideration of fatigue strength of a connection part between the inner mounting block and the clamp arm depending on weight of the antenna device coupled to the tilting unit and a length of the clamp arm.

Moreover, at least one rotation guide part may be formed at a tip portion of the clamp arm, to which the mounting space is provided, in a slot hole shape so as to guide a rotating motion of the rotation unit.

Moreover, the rotation guide part may include: at least one rotation guide slot that is formed in a circumference having a common center with the hinge point; and a rotation guide bolt that passes through the at least one rotation guide slot from an outside and is fixed to the rotation unit.

Moreover, a rotating angle label, which indicates a position of the rotation guide bolt moved in the rotation guide slot from a reference point at an angle, may be attached to the tip portion of the clamp arm.

Moreover, the rotation unit may include: tilting unit installing stages to which the tilting unit is tiltably coupled; a rotating block that is inserted into the mounting space of the arm unit; and a connecting block that interconnects the tilting unit installing stages and the rotating block.

Moreover, a rotating braking washer pad may be interposed between the rotating block and the arm unit, and tilting braking washer pads may be interposed between the tilting unit installing stages and the tilting unit.

Moreover, a rotating braking washer pad mounting recess, to which the rotating braking washer pad is coupled in a corresponding shape, may be formed in an upper surface of the rotating block, and tilting braking washer pad mounting recesses, to which the tilting braking washer pads are coupled in a corresponding shape, may be formed in inner lateral surfaces of the tilting unit installing stages.

Moreover, a plurality of braking protrusions may be formed to protrude from an upper surface of the rotating braking washer pad and inner lateral surfaces of the tilting braking washer pads.

Moreover, the tilting unit installing stages may be provided apart from each other in a pair so as to extend from left and right ends of the connecting block toward the tilting unit, and tilting pins becoming a tilting center of the tilting unit may be provided in outer lateral surfaces of the tilting unit installing stages so as to be connected with the tilting unit.

Moreover, the tilting unit may include: antenna coupling stages that are coupled with the antenna device; and tilting blocks that are coupled to come into surface contact with one outer lateral surface and the other outer lateral surface of the rotation unit, and tilting guides may be formed in a slot hole shape and be attached to the tilting blocks so as to guide a tilting motion of the tilting unit.

Moreover, the tilting blocks may be tilted about tilting pins that are provided to outer lateral surfaces of tilting unit installing stages of the rotation unit so as to become a tilting center of the tilting unit, and the tilting guides may include: tilting guide slots that are formed on circumferences having common centers with the tilting pins; and tilting guide bolts that pass through the tilting guide slots from an outside and are fixed to the rotation unit.

Moreover, a tilting angle label, which indicates a position of each of the tilting guide bolts moved in each of the tilting guide slots from a reference point at an angle, may be attached to an outer lateral surface of each of the tilting blocks.

Moreover, the tilting unit may further include an expansion connector that is expanded to connect the antenna coupling stage and the tilting block in a left-right direction.

Moreover, each of the antenna coupling stages may come into surface contact with a plurality of places of any one of a rear surface and a lateral surface of the antenna device, and be fastened and fixed to fastening holes formed in the plurality of places of any one of the rear surface and the lateral surface of the antenna device via fastening means.

Moreover, each of the antenna coupling stages may have at least two or more fastening flanges, in each of which a U-shaped fastening hole having an open upper side is formed, such that fixing screws, which are previously fastened to a plurality of places of a lateral surface of the antenna device in a temporarily fixed form, are hung downward and then screwed.

Moreover, the support pole may include: multiple support rods that slantly extend downward from an outer circumferential surface of the support pole and are radially spaced apart from one another at a predetermined angle; and supporting panels that are provided at tips of the multiple support rods and are supported and coupled to a ground or a wall.

Advantageous Effects

An embodiment of the clamping apparatus for an antenna according to the present disclosure can achieve the following various effects.

First, an arm unit is manufactured in various lengths and is installed, and thereby spatial layout design of multiple antenna devices installed on one support pole is easy.

Second, tilting and rotating motions of the antenna device are facilitated through a tilting unit and a rotation unit, and thus workability and frequency yield performance of the antenna device can be improved.

DESCRIPTION OF REFERENCE NUMERALS

Figure 1:
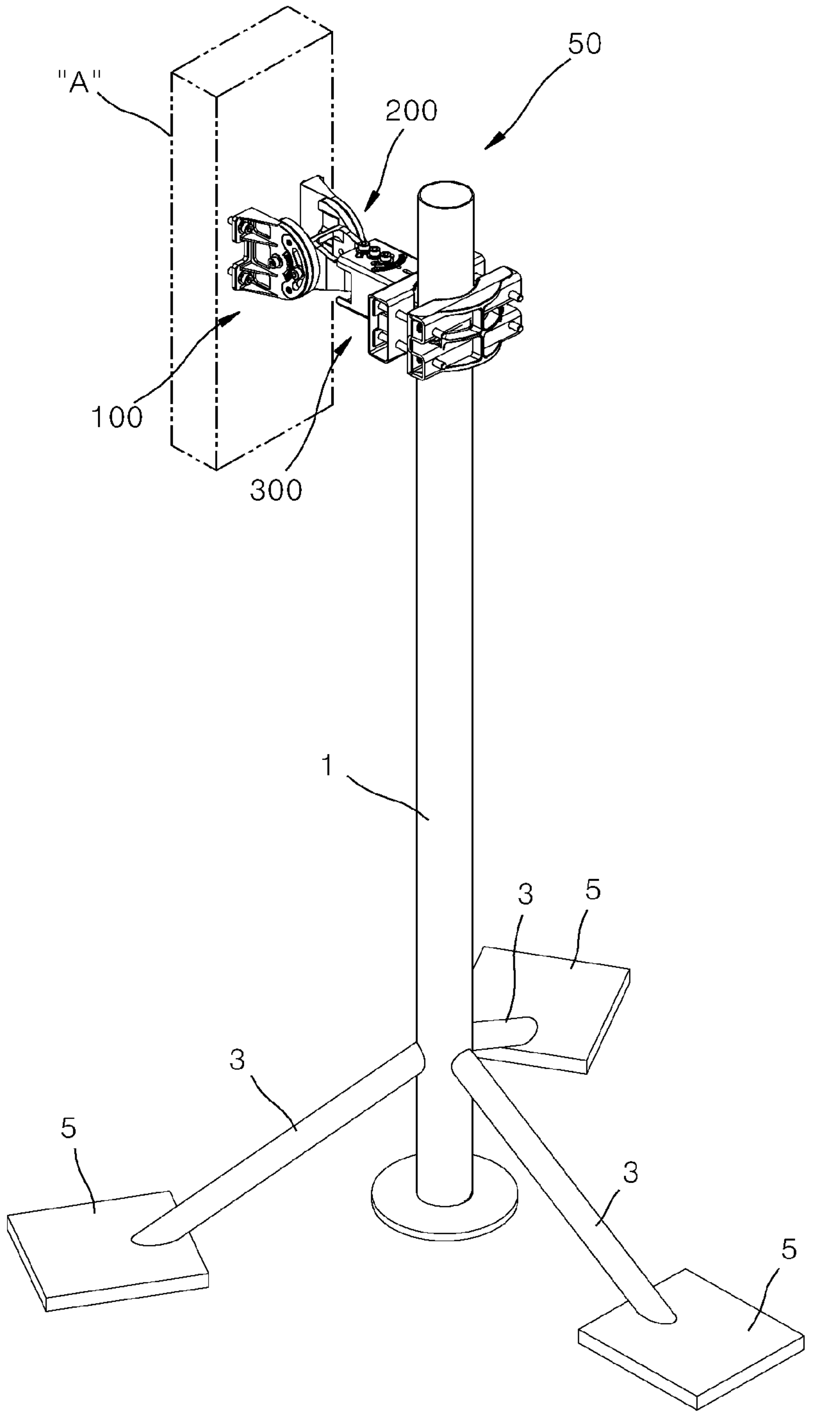
FIG. 1 is a perspective view illustrating an example of a state in which an antenna device is installed in an embodiment of a clamping apparatus for an antenna according to the present disclosure.

1: support pole 3: multiple support rods
5: supporting panel 50: clamping apparatus for antenna
100: tilting unit 101: antenna coupling stage
102: guide slot mounting recess 103: tilting block
104: tilting braking washer pad mounting recess 107: reinforcement rib
108: fixing hole 109: tilting through-slot
110: fastening bolt 120: tilting braking washer pad
121: fastening hole 122: fastening screw
123: washer through-slot 125: braking protrusion
127: rotating pin through-hole 130: tilting guide
131: fastening hole 132: fastening screw
133: tilting guide slot 140: tilting pin
150: tilting angle label 200: rotation unit
210: tilting unit installing stage 211: pad installation recess
212: friction pad 213: friction pad installing hole
214: friction pad through-hole 215: flat head screw
217: rotating pin fastening hole 220: rotating block
220*a*: lower block 220*b*: upper block
220*c*: center block 221: rotating braking washer pad mounting recess
222*a*: upper hinge fastening hole 222*b*: front guide bolt fastening hole
222*c*: rear guide bolt fastening hole 225: fixing hole
230: connecting block 240: rotating braking washer pad
241: braking protrusion 250: mounting guide unit
251: lower hinge fastening hole 252: internal thread
260: guide tube 261: hanging rib
270: anti-separation nut 271: external thread
280: elastic body 300: arm unit
310: outer mounting block 311: outer bolt through-hole
313: nut fastening part 320: inner mounting block
323: inner shape-fitting recess 325: fixing bolt
330: clamp arm 331: mounting space
333*a*: front guide slot 333*b*: rear guide slot
334*a*: lower hinge hole 334*b*: upper hinge hole
335: upper rotating pin 336*a*: front rotation guide bolt
336*b*: rear rotation guide bolt 337: lower rotating pin
340: support block 341: support bolt through-hole
343: outer shape-fitting recess 350: rotating angle label
360: fastening nut 400: reinforcement wire unit

BEST MODE

Hereinafter, an embodiment of a clamping apparatus for an antenna according to the present disclosure will be described in detail with reference to the accompanying drawings. In adding reference numerals to the elements of each drawing, it should be noted that the same elements have the same reference numerals as much as possible even if they are displayed in different drawings. Moreover, in describing embodiments of the present disclosure, when it is determined that a detailed description of the related well-known configuration or function hinders understanding of an embodiment of the present disclosure, the detailed description thereof will be omitted.

Furthermore, in describing elements of an embodiment of the present disclosure, terms, such as a first, a second, A, B, (a), and (b), may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

Figure 2:
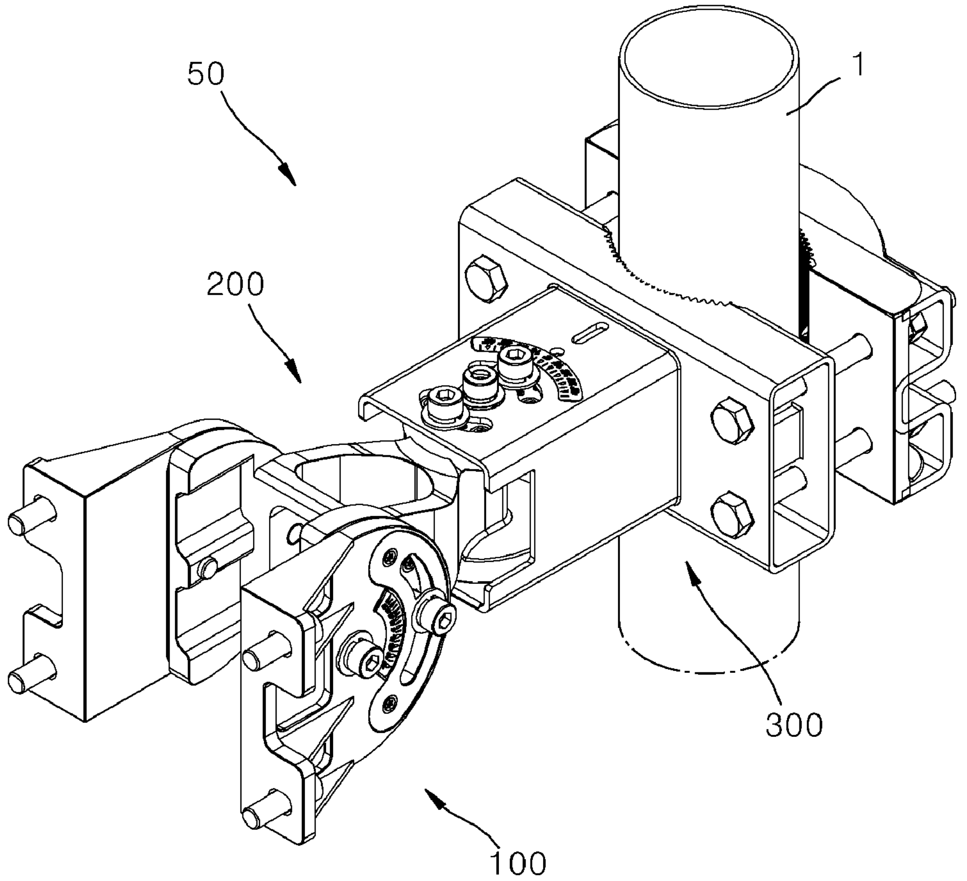
FIG. 2 is a perspective view illustrating an embodiment of a clamping apparatus for an antenna according to the present disclosure.
Figure 3:
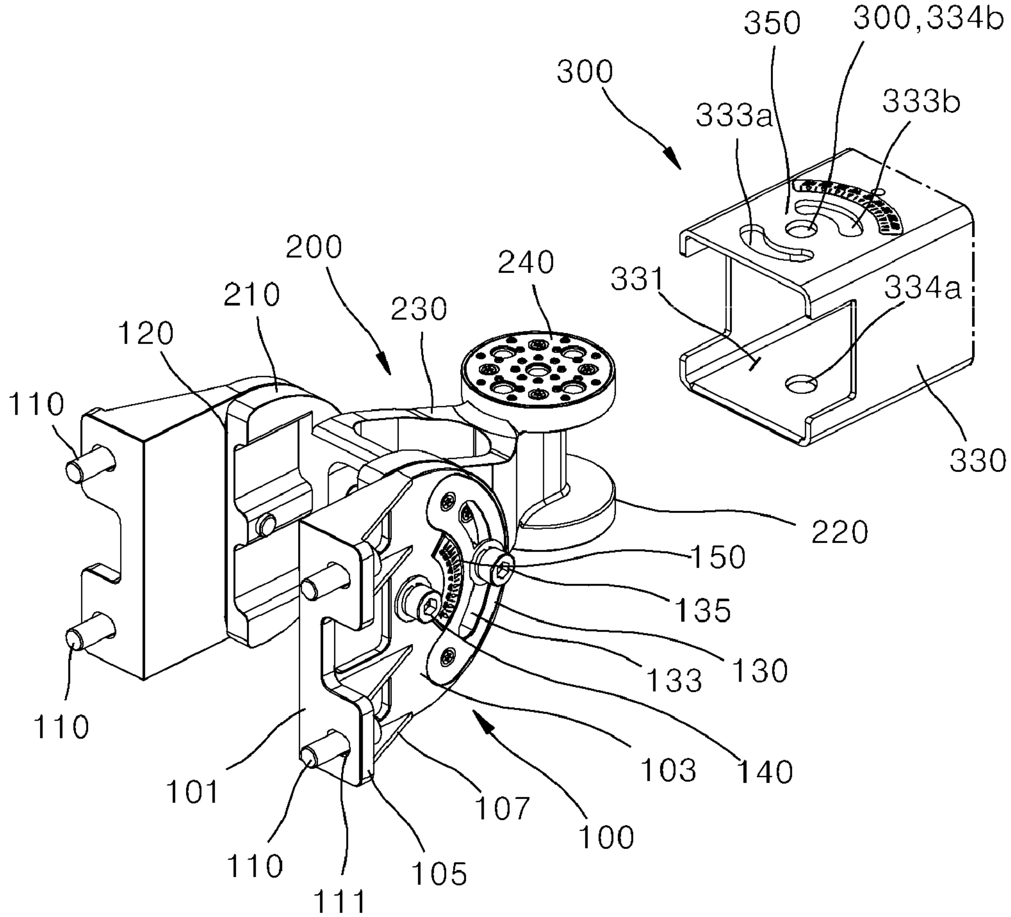
FIG. 3 is an exploded perspective view illustrating the clamping apparatus of FIG. 2.
Figure 4:
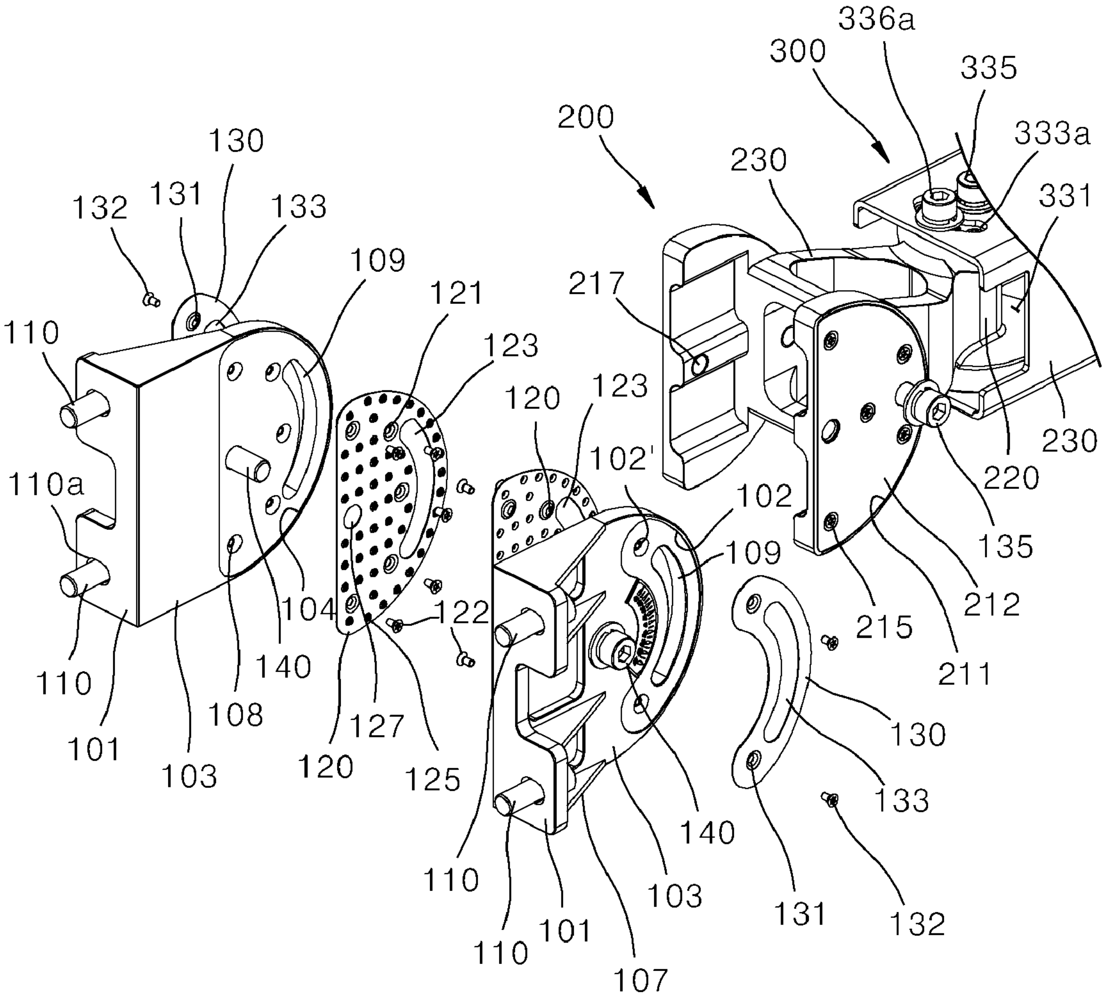
FIG. 4 is an exploded perspective view illustrating a tilting unit among the components of FIG. 2.
Figure 5:
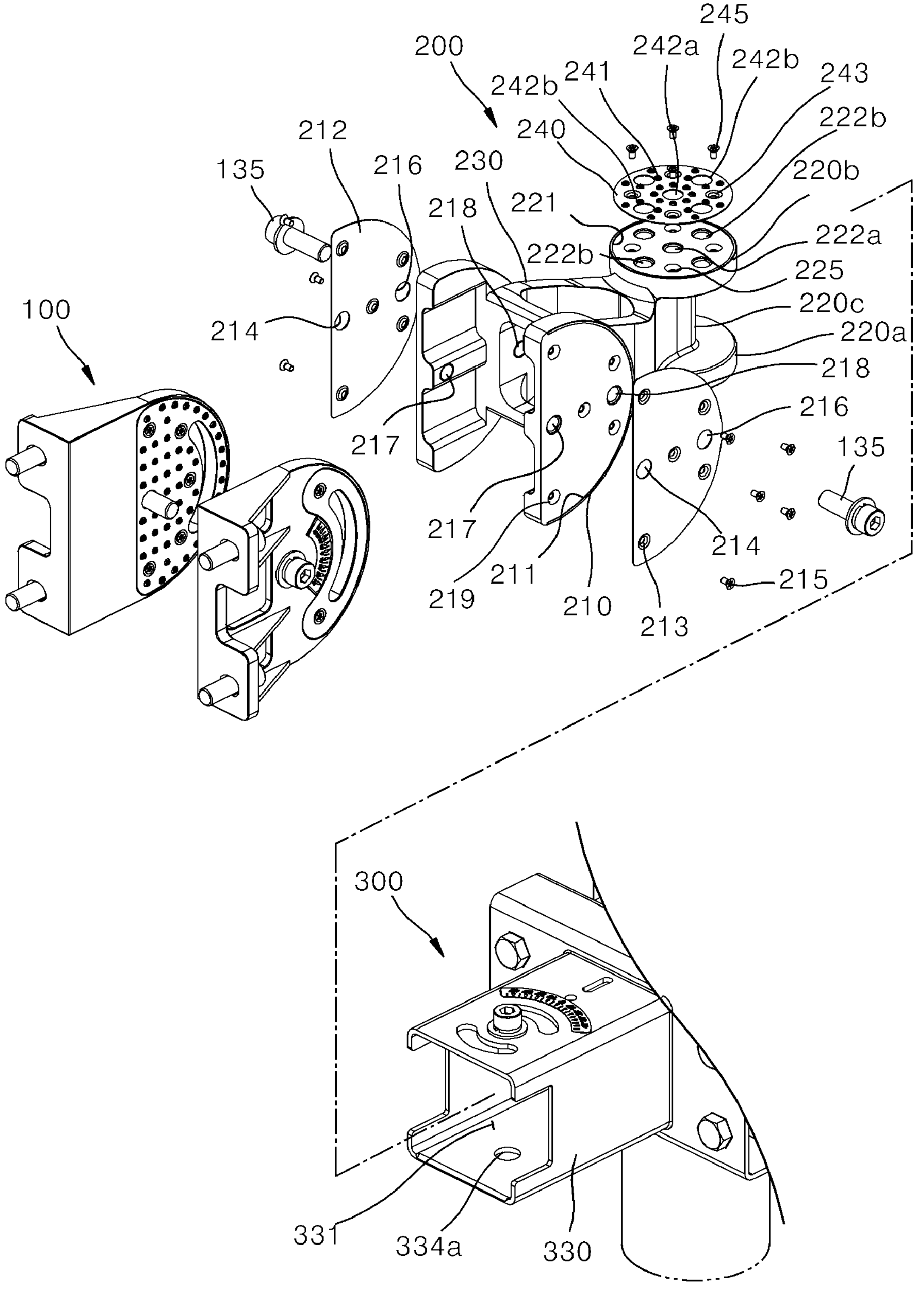
FIG. 5 is an exploded perspective view illustrating a rotation unit among the components of FIG. 2.
Figure 6:
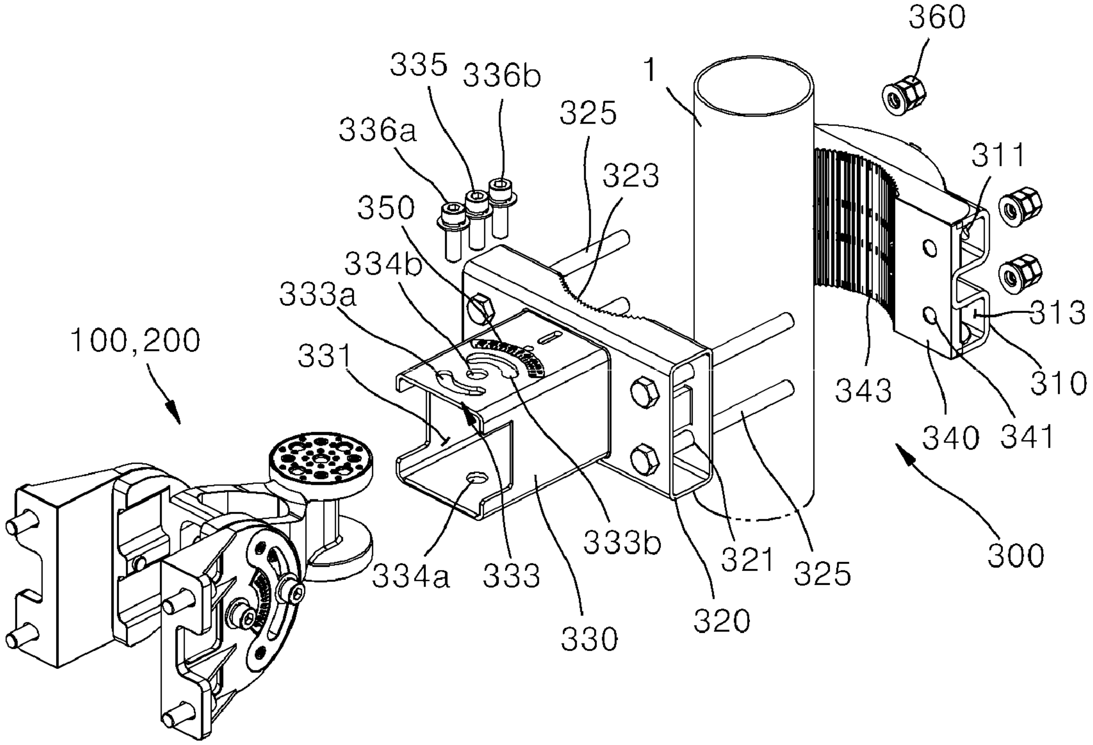
FIG. 6 is an exploded perspective view illustrating an arm unit among the components of FIG. 2.

FIG. 1 is a perspective view illustrating an example of a state in which an antenna device is installed in an embodiment of a clamping apparatus for an antenna according to the present disclosure. FIG. 2 is a perspective view illustrating an embodiment of a clamping apparatus for an antenna according to the present disclosure. FIG. 3 is an exploded perspective view illustrating the clamping apparatus of FIG. 2. FIG. 4 is an exploded perspective view illustrating a tilting unit among the components of FIG. 2. FIG. 5 is an exploded perspective view illustrating a rotation unit among the components of FIG. 2. FIG. 6 is an exploded perspective view illustrating an arm unit among the components of FIG. 2

Referring to FIGS. 1 to 6, an embodiment of a clamping apparatus 50 for an antenna according to the present disclosure includes an arm unit 300 that is horizontally coupled to a support pole 1 that is fixed to the ground in a vertical direction, a rotation unit 200 that is coupled with the arm unit 300 and is coupled to be rotatable about the arm unit 300 in a left-right direction, and a tilting unit 100 that is coupled to the rotation unit 200 and is coupled to be tiltable in an up-down direction while mediating coupling of an antenna device A.

Referring to FIG. 1, the support pole 1 in an embodiment of the present disclosure is implemented by being fixed to the ground via multiple support rods 3 and multiple supporting panels 5 in a vertical direction, and is implemented in such a manner that the arm unit 300 is horizontally coupled with the support pole so as to be perpendicular to the support pole.

However, the support pole 1 is not necessarily provided to the ground in a vertical direction, and may be naturally coupled to a vertical wall of a building via the multiple support rods 3 and the multiple supporting panels 5. In this case, the support pole 1 is provided horizontally, and the arm unit 300 is perpendicular to the support pole 1. However, various embodiments in which the support pole 1 and the arm unit 300 are actually provided horizontally or vertically can be expected.

Hereinafter, the description is made on the assumption that, referring to FIG. 1, to enable a direction and its relevant term to be identical to each other, the support pole 1 is fixed to the ground of a horizontal state via the multiple support rods 3 and the multiple supporting panels 5 in a vertical direction, and the description is made within the limits of the case in which the arm unit 300 extends in a horizontal direction orthogonal to the support pole 1. However, it is made clear in advance that an embodiment of the present disclosure does not necessarily limit these directions.

The arm unit 300 serves to mediate coupling of the antenna device A to the support pole 1. It can be understood that, as another meaning, the arm unit 300 serves to mediate coupling of the clamping apparatus 50 for an antenna, to which the antenna device A is coupled, to the support pole 1.

The antenna device A coupled by the clamping apparatus 50 for an antenna according to an embodiment of the present disclosure may be the antenna device A to which the Massive MIMO technology or the FD-MIMO technology in which the 3D-Beamforming is possible, which is introduced in the "Background Art" described previously, is applied.

This arm unit 300 may be formed in such a form that it is substantially coupled to one side and the other side of an outer circumferential surface of the support pole 1 by bolting and that it extends at a predetermined length in a direction perpendicular to a lengthwise direction of the support pole 1 and the antenna device A is installed spaced apart from the support pole 1 by a predetermined length.

The rotation unit 200 may be coupled to a tip portion of the arm unit 300 so as to be rotatable in a left-right direction. The rotation unit 200 is rotated about the tip portion of the arm unit 300 in a left-right direction, thereby serving to substantially facilitate directivity design of the left-right direction of the antenna device A coupled to the tilting unit 100.

Moreover, the tilting unit 100 is coupled to a tip portion of the rotation unit 200 so as to be tiltable in an up-down direction. The tilting unit 100 is tilted about the tip portion of the rotation unit 200 in an up-down direction, thereby serving to substantially facilitate directivity design of the up-down direction of the antenna device A coupled to the tilting unit 100.

In this way, an embodiment of the clamping apparatus 50 for an antenna according to the present disclosure enables angle fixation with respect to a radiation direction of radio waves radiated from a front surface of the antenna device A coupled to the support pole 1 by rotating the antenna device A in a left-right direction using the rotation unit 200, as well as by tilting the antenna device A in an up-down direction using the tilting unit 100. A state of the angle fixation caused by the rotation unit 200 and the tilting unit 100 will be described below in greater detail.

Hereinafter, for the convenience of understanding, the description will be made by defining a front direction of the antenna device A as "front", defining the opposite direction as "rear", defining a left side of the front as "leftward direction" and a right side of the front as "rightward direction", and defining an upper side of the antenna device A as "upward direction" and a lower side of the antenna device A as "downward direction".

Hereinafter, the description will be made in greater detail from an adjacent component centering on the antenna device A.

Referring to FIGS. 1 to 6, the antenna device A is coupled to a tip portion of the tilting unit 100. More specifically, the antenna device A is coupled to the tip portion of the rotation unit 200 such that the tilting unit 100 is tiltable in a state coupled to the tip portion of the tilting unit 100. In this state, referring to FIG. 3, the rotation unit 200 is mounted in a mounting space 331 that is provided at the tip portion of the arm unit 300 fixed to the support pole 1, whereby, referring to FIG. 2, the installation of the antenna device A based on an embodiment of the clamping apparatus 50 for an antenna according to the present disclosure can be completed.

Here, referring to FIG. 4, the tilting unit 100 may include antenna coupling stages 101 that are coupled with the antenna device A, and tilting blocks 103, each of which extends to the rear where the rotation unit 200 is provided and is coupled to come into surface contact with one outer lateral surface or the other outer lateral surface of the rotation unit 200.

Each of the antenna coupling stages 101 is a part that comes into close contact with a rear surface of the antenna device A and has bolt through-holes 110*a* formed to be able to be bolted by fastening bolts 110. Referring to FIG. 4, two bolt through-holes 110*a* may be formed spaced apart from each other up and down by a predetermined distance.

Referring to FIG. 4, each of the tilting blocks 103 is a part that has a surface orthogonal to a coupling surface of each of the antenna coupling stages 101 and is substantially coupled to a left or right lateral surface of the tip portion of the rotation unit 200.

Multiple reinforcement ribs 107 are provided between each of the tilting blocks 103 and each of the antenna coupling stages 101, and can improve durability by reinforcing a mechanical fatigue caused by weight of the antenna device A or wind around the antenna device A.

Each of the tilting blocks 103 may be configured such that a tilting guide 130, which is formed in a slotted plate shape so as to guide the tilting motion of the tilting unit 100, is attached to an outer lateral surface thereof opposite to an inner lateral surface thereof which comes into close contact with the left or right lateral surface of the tip portion of the rotation unit 200. In addition, each of the tilting blocks 103 may be configured such that a tilting pin 140 is provided to the inner surface thereof which comes into close contact with the left or right lateral surface of the tip portion of the rotation unit 200 so as to become a tilting center of the tilting unit 100.

Each of the tilting guides 130 may include a tilting guide slot 133 that is formed in the same circumference thereof centering on the tilting pin 140, and a tilting guide bolt 135 that passes through the tilting guide slot 133 from the outside and is fixed to the rotation unit 200.

Each of the tilting guides 130 may be provided in a plate shape corresponding to a shape of a guide slot mounting recess 102 that is formed to be recessed in the same depth toward an inner lateral surface from an outer lateral surface of the tilting block 103, and the tilting guide slot 133 may be formed to pass through the tilting guide 130 in a left-right direction. Fixing holes 102', to which fastening screws 132 provided in the form of a flat head screw are fastened to pass through fastening holes 131 formed in the tilting guide 130, may be formed in the guide slot mounting recess 102.

Here, the tilting guide slot 133 formed in the tilting guide 130 is formed in the same circumference having a common center with the tilting pin 140, and may be formed to have a circumferential surface on which the tilting unit 100 is tiltable upward and downward on the basis of the horizon at a maximum angle of 40 degrees.

Referring to FIG. 3, a tilting angle label 150, which indicates a position of the tilting guide bolt 135 moving in the tilting guide slot 133 from a reference point at an angle, may be attached to a part of an outer lateral surface of the tilting block 103 which corresponds to one side of the tilting guide 130.

Here, the reference point for the position of the tilting guide bolt 135 refers to a horizontal state in which no tilting motion of the tilting block 103 is performed and is indicated by "0 degree", and the tilting angle may be indicated with respect to each of upward tilting and downward tilting at angular intervals of 5° or 10°. Therefore, an installation worker mounts the antenna device A on the tilting unit 100, and then fixes the tilting unit 100 by tilting the tilting unit 100 at an accurate position through the tilting angle label 150, whereby reliability of installation work of the antenna device A can be improved.

The tilting pin 140 is a kind of bolt that is installed to pass through the tilting block 103 from an outside to an inside of the tilting block 103, is fixed to the outer lateral surface of the rotation unit 200 like a hinge, and becomes a tilting center of the tilting unit 100.

The tilting unit 100 may be provided in a pair so as to be coupled to tilting unit installing stages 210 provided left and right in a pair among the components of the rotation unit 200. Therefore, the description is made on the assumption that components of the tilting unit 100 described above and components of the tilting unit 100 to be described below are provided in bilateral symmetry in a pair unless defined otherwise.

Meanwhile, tilting braking washer pads 120 may be interposed between inner lateral surfaces of the tilting blocks 103 and outer lateral surfaces of the rotation unit 200 (preferably, outer lateral surfaces of the tilting unit installing stages 210). Each of the tilting braking washer pads 120 may be fastened to a tilting braking washer pad mounting recess 104 recessed in the inner lateral surface of the tilting block 103 so as to correspond to a shape of the tilting braking washer pad mounting recess 104 by a process of fastening screws 122 provided in the form of a flat head screw passing through and being fastened to fastening holes 121 formed across left and right and fixing holes 108 formed in the inner lateral surface of the tilting block 103.

A plurality of braking protrusions 125 are formed on an inner lateral surface of each of the tilting braking washer pads 120 so as to protrude inward, thereby serving to prevent the antenna device A from being arbitrarily tilted by weight of the antenna device A and an external force such as a wind blowing around the antenna device A by forming a predetermined friction force between the inner lateral surface of the tilting braking washer pad 120 and the outer lateral surface of the rotation unit 200 during the tilting motion of the tilting unit 100. As will be described below, friction pads 212 are installed on the outer lateral surfaces of the tilting unit installing stages 210 of the rotation unit 200, thereby forming a mutual friction force with the tilting braking washer pads 120.

A washer through-slot 123, through and to which the tilting guide bolt 135 can pass and be fastened, may be formed in each of the tilting braking washer pads 120 in a shape corresponding to the tilting guide slot 133. In addition, a tilting through-slot 109 having a shape corresponding to the tilting guide slot 133 may be formed in the tilting block 103. The tilting guide bolt 135 is a bolt that is fixedly fastened to the left or right lateral surface of the tip portion of the rotation unit 200, and may pass through the tilting guide slot 133, the tilting through-slot 109, and the washer through-slot 123 in turn and be fixedly fastened to the left or right lateral surface of the tip portion of the rotation unit 200.

If a predetermined tilting external force is provided to the tilting blocks 103 having this configuration when upward/downward tilting of the antenna device A coupled to tip portions of the tilting blocks 103 is required, after an upward or downward tilting motion is performed within a tilting angle range of the tilting guide slots 133 when an external force exceeding a friction force of the tilting braking washer pads 120 is provided, the tilting blocks 103 can be fixed.

Meanwhile, referring to FIG. 5, the rotation unit 200 may include tilting unit installing stages 210 to which the tilting unit 100 is tiltably coupled, a rotating block 220 that is inserted into a mounting space 331 of the arm unit 300, and a connecting block 230 that interconnects the tilting unit installing stages 210 and the rotating block 220.

Here, the tilting unit installing stages 210 are provided apart from each other in a pair so as to extend from left and right ends of the connecting block 230 toward the tilting unit 100. As described above, the tilting pins 140 acting as the tilting center of the tilting unit 100 may be provided on outer lateral surfaces of the tilting unit installing stages 210 so as to be connected with the tilting unit 100.

That is, the above-described tilting blocks 103 of the tilting unit 100 are installed on the outer lateral surfaces of the tilting unit installing stages 210 of the rotation unit 200, and may be provided in a pair like the tilting unit installing stages 210.

As described above, the tilting guide bolts 135 are fixed to the outer lateral surfaces of the tilting unit installing stages 210 so as to pass through the tilting blocks 103, the tilting guides 130, and the tilting braking washer pads 120 of the tilting unit 100, and tilting pin fastening holes 217 may be formed in the tilting unit installing stages 210 such that the tilting pins 140 pass through and be fastened to the tilting blocks 103 of the tilting unit 100.

In addition, the friction pads 212, which provide friction surfaces against which the braking protrusions 125 of the tilting braking washer pads 120 are rubbed, may be installed in pad installation recesses 211 of the outer lateral surfaces of the tilting unit installing stages 210 by flat head screws 215. The flat head screws 215 may install and fix the friction pads 212 by passing through friction pad installing holes 213 formed in the friction pads 212 and being fastened and fixed to friction pad fixing holes 219 of the tilting unit installing stages 210. Therefore, the friction pads 212 can be easily replaced when worn by a continuous tilting motion.

Meanwhile, among the components of the rotation unit 200, a rotating block 220 is a part which is inserted into and installed in the mounting space 331 provided in the tip portion of the arm unit 300 in a hollow form, and which enables the rotation unit 200 to be rotated in the mounting space 331 in a left-right direction.

Referring to FIG. 5, the rotating block 220 may include a lower block **220*a* that comes into close contact with a lower surface of the mounting space 331 of the arm unit 300, an upper block 220*b* that is provided at an upper side of the lower block 220*a* so as to be separated at a predetermined distance and comes into close contact with an upper surface of the mounting space 331, and a center block 220*c* that interconnects the lower block 220*a* and the upper block 220*b***.

Meanwhile, referring to FIG. 5, a rotating braking washer pad 240 performing the same function as the above-described tilting braking washer pads 120 may be interposed between the rotating block 220 and the arm unit 300.

More specifically, if each of the tilting braking washer pads 120 is installed between the tilting unit installing stage 210 and the tilting unit 100 and produces a predetermined friction force during a tilting motion, the rotating braking washer pad 240 can produce a predetermined friction force between the rotating block 220 and the arm unit 300 during a rotating motion in a left-right direction and serve to prevent the antenna device A from being moved in a left-right direction by an arbitrary external force.

The rotating braking washer pad 240 may be mounted in a rotating braking washer pad mounting recess 221, which is formed to be recessed from an upper surface of the upper block 220*b* among the components of the rotating block 220, in a corresponding shape. Fastening holes 243 through which flat head screws 245 pass are provided in the rotating braking washer pad 240 so as to be across up and down, and fixing holes 225 to which the flat head screws 245 are fastened and fixed are formed in a part corresponding to the rotating braking washer pad mounting recess 221. The rotating braking washer pad 240 can be fixed to the rotating braking washer pad mounting recess 221 by a process of the flat head screws 245 being fastened to the fastening holes 243 and the fixing holes 225 in turn.

A plurality of braking protrusions 241 are provided on an upper surface of the rotating braking washer pad 240, and produce the above-described friction force between the upper surface of the rotating braking washer pad 240 and the upper surface of the hollow mounting space 331.

Meanwhile, referring to FIG. 5, an upper hinge fastening hole 222*a*, which forms a hinge point to which an upper rotating pin (see a reference numeral 335 of FIG. 6) is fastened, may be formed in the upper block 220*b* among the components of the rotating block 220, and a front guide bolt fastening hole 222*b* and a rear guide bolt fastening hole 222*c* to which a front rotation guide bolt 336*a* and a rear rotation guide bolt 336*b*, which are provided to guide leftward and rightward rotating motions of the rotation unit 200 acting as one component of the rotation guide of the arm unit 300 (to be described below), are fastened may be formed in the upper block 220*b*. In addition, because the upper rotating pin 335, the front rotation guide bolt 336*a*, and the rear rotation guide bolt 336*b* are also through-fastened to the rotating braking washer pad 240, an upper hinge through-hole 242*a*, a front guide bolt through-hole 242*b*, and a rear guide bolt through-hole 242*b* may be formed in the rotating braking washer pad 240.

A lower hinge fastening hole (see a reference numeral 251 of FIG. 10) in which a mounting guide unit (to be described below) is provided may be provided in the lower block 220*a* among the components of the rotating block 220.

Meanwhile, the clamping apparatus 50 for an antenna according to an embodiment of the present disclosure may further include a mounting guide unit (see a reference numeral 250 of FIG. 10) provided to the lower block 220*a* among the components of the rotating block 220.

The mounting guide unit 250 is provided to the rotation unit 200, and serves to be temporarily fixed to the lower hinge fastening hole 251 that forms the hinge point in the mounting space 331 after being elastically compressed when the rotation unit 200 is mounted in the mounting space 331 of the arm unit 300. Therefore, with the antenna device A, which is a predetermined weight body, coupled to the tip portion of the tilting unit 100, the rotation unit 200 can be more easily fixed to the arm unit 300 along with the tilting unit 100. This mounting guide unit 250 will be described in detail after the arm unit 300 is described first.

Meanwhile, referring to FIG. 6, the arm unit 300 may include an outer mounting block 310 that is disposed to come into close contact with one side of an outer circumferential surface of the support pole 1, an inner mounting block 320 that is disposed to come into close contact with the other side of the outer circumferential surface of the support pole 1 and is fixed with the outer mounting block 310 by at least one or more fixing bolts 325, and a clamp arm 330 that extends from the inner mounting block 320 at a predetermined length in a direction orthogonal to the support pole 1 and constitutes a tip portion to which the mounting space 331 is provided.

The outer mounting block 310 may be formed of a steel material, and may form a frame. A support block 340, in which an outer shape-fitting recess 343, which is a part that substantially corresponds to a shape of the one side of the outer circumferential surface of the support pole 1, is formed and which is formed of an elastic material having a high friction force such that a slip is not generated between the support block 340 and the support pole 1 to come into close contact, may be coupled to the outer mounting block 310 so as to be disposed between the outer mounting block 310 and the support pole 1.

At least one or more outer bolt through-holes 311 through which fixing bolts 325 pass may be formed in left and right opposite ends of the outer mounting block 310 so as to be spaced up and down. Support bolt through-holes 341 may also be formed in the support block 340 at positions corresponding to the outer bolt through-holes 311. Inner bolt through-holes 321 may also be formed in the inner mounting block 320 at positions corresponding to the outer bolt through-holes 311 and the support bolt through-holes 341.

The outer mounting block 310, the support block 340, and the inner mounting block 320 are fastened such that the fixing bolts 325 pass through the inner bolt through-holes 321, the support bolt through-holes 341, and the outer bolt through-holes 311 from the side of the inner mounting block 320 in turn, and then are firmly fastened using fastening nuts 360, whereby the antenna device A can be stably supported.

Here, the fastening nuts 360 are fastened to nut fastening parts 313, which are formed as empty spaces between the outer bolt through-holes 311 of the outer mounting block 310 and the support bolt through-holes 341, in a hidden state, and thereby can be provided such that arbitrary disassembly is made difficult by a third person.

Among the components of the support block 340, the outer shape-fitting recess 343, which is a part that substantially comes into close contact with the one side of the outer circumferential surface of the support pole 1, may be formed to be recessed in a shape corresponding to the outer circumferential surface of the support pole 1 in order to improve a close contact area with respect to the support pole 1 having a circular cross section. In addition, the outer shape-fitting recess 343 may be serration-machined such that multiple serration ribs are formed for a stronger friction force while being compressed on the outer circumferential surface of the support pole 1 by a fastening force from the fixing bolts 325 and the fastening nuts 360.

Meanwhile, an inner shape-fitting recess 323 corresponding to the outer shape-fitting recess 343 of the support block 340 may be formed in an outer lateral surface of the inner mounting block 320, i.e. a surface that substantially comes into close contact with the support pole 1. The inner mounting block 320 is formed of a steel material for support rigidity. However, regardless of this, the inner shape-fitting recess 323 may also be subjected to serration machining such that multiple serration ribs are formed to prevent a slip from being generated between the inner mounting block 320 and the support pole 1.

The inner mounting block 320 and the clamp arm 330 may be integrally molded. Here, the inner mounting block 320 may be formed such that an up-down-left-right area (i.e., a front area) thereof is relatively larger than that occupied by the clamp arm 330. In addition, depending on an embodiment, a tip portion of the clamp arm 330 may be formed to have various distances spaced apart from the support pole (see FIG. 15 to be described below).

When a length of the clamp arm 330 is relatively short, weight of the antenna device A can be sufficiently supported by an integral molding method of a connecting part between the inner mounting block 320 and the clamp arm 330. However, when the length of the clamp arm 330 is relatively long, at least one or more reinforcement ribs (see a reference numeral 380 of FIG. 12) may be formed at the connecting part between the inner mounting block 320 and the clamp arm 330.

Furthermore, in the case where the length of the clamp arm 330 is formed relatively long, i.e. in the case where fatigue strength of the connecting part between the inner mounting block 320 and the clamp arm 330 due to the weight of the antenna device coupled to the tilting unit 100 and the length of the clamp arm 330 is not satisfied only by the formation of at least one or more above-described reinforcement ribs 380, the fatigue strength should be reinforced. To this end, the clamping apparatus 50 for an antenna according to an embodiment of the present disclosure may further include a reinforcement wire unit (see a reference numeral 400 of FIGS. 12, 13, and 15 to be described below).

The reinforcement wire unit 400 may include a connecting wire 420, one end of which is fixed to a part of the support pole 1 which corresponds to an upper portion of the arm unit 300, and the other end of which is fixed to the clamp arm 330 of the arm unit 300. An installing bracket 410 and a one-side connecting ring 411 to which the one end of the connecting wire 420 is connected may be provided to the part of the support pole 1, and the other-side connecting ring 412 to which the other end of the connecting wire 420 is connected may be provided to a tip portion of the clamp arm 330 of the arm unit 300.

As described above, this reinforcement wire unit 400 may be selectively installed in consideration of the length of the clamp arm 330 manufactured to have various lengths, the weight of the antenna device coupled to the tilting unit 100, and the fatigue strength of the connecting part between the inner mounting block 320 and the clamp arm 330.

An embodiment of the clamping apparatus 50 for an antenna according to the present disclosure is configured such that the clamp arm 330 as one component of the arm unit 300 is provided to have various lengths, thereby providing an advantage that causes installation work to be more easily completed while removing spatial limitations on multiple antenna devices (regardless of whether or not they are antenna devices of the same communication company) installed on one support pole 1.

Meanwhile, referring to FIG. 6, the mounting space 331 into which the rotating block 220 of the rotation unit 200 is rotably inserted and installed is provided to the tip portion of the clamp arm 330. The clamp arm 330 is formed in the shape of a pipe which has an approximately rectangular vertical section and which has an empty space therein, and the empty space may be defined as the mounting space 331.

A lower hinge hole 334*a* provided in the shape of a fastening hole, into which a lower rotating pin 337 (to be described below) is inserted and then is inserted into and fixed in the lower hinge fastening hole 251 formed in the lower block 220*a* of the rotating block 220, may be formed in a lower surface of the mounting space 331 so as to be across up and down.

Moreover, an upper hinge hole 334*b* provided in the shape of a fastening hole, into which an upper rotating pin 335 (to be described below) is inserted and then is inserted into and fixed in the upper hinge fastening hole 222*a* formed in the upper block 220*b* of the rotating block 220, may be formed in an upper surface of the mounting space 331 so as to be across up and down.

In addition, at least one rotation guide part 333 may be formed on an upper surface of the mounting space 331 in a slot hole shape so as to guide a rotating motion of the rotation unit 200, and be formed at front and rear sides of the upper hinge hole 334*b* so as to be spaced apart from the front and rear sides.

Here, the rotation guide part 333 may include at least one rotation guide slot 333*a* and 333*b* that are formed on the same circumference in common with the upper hinge hole 334*b* acting as the above-described hinge point, and rotation guide bolts 336*a* and 336*b* that pass through the at least one rotation guide slot 333*a* and 333*b* from the outside and are fixed to the rotation unit 200.

As described above, the rotation guide slots 333*a* and 333*b* may include a front guide slot 333*a* that is formed at a front side on the basis of the upper hinge hole 334*b*, and a rear guide slot 333*b* that is formed at a rear side on the basis of the upper hinge hole 334*b*.

In addition, the rotation guide bolts 336*a* and 336*b* may also include a front rotation guide bolt 336*a* that is inserted into and passes through the front guide slot 333*a* and is inserted into and fastened to the front guide bolt fastening hole 242*b* of the upper block 220*b* among the components of the rotation unit 200, and a rear rotation guide bolt 336*b* that is inserted into and passes through the rear guide slot 333*b* and is inserted into and fastened to the rear guide bolt fastening hole 242*c* of the upper block 220*b* among the components of the rotation unit 200.

Therefore, the rotation unit 200 can be rotated while being subjected to guidance and restriction of the front guide slot 333*a* and the rear guide slot 333*b* located at the front side and the rear side centering on the lower hinge hole 334*a* and the upper hinge hole 334*b* which form hinge points to which the lower rotating pin 337 and the upper rotating pin 335 are coupled when a worker provides an external force for a rotating motion in any one of leftward and rightward directions to the antenna device A coupled to the tilting unit 100. In this case, a friction force caused by the rotating braking washer pad 240 provided between the rotating block 220 and the arm unit 300 is applied, whereby an arbitrary rotating motion caused by an external force other than the external force of the worker can be prevented.

Meanwhile, a rotating angle label 350, which indicates positions of the rotation guide bolts 336*a* and 336*b* moving in the rotation guide slots 333*a* and 333*b* from a reference point at an angle, may be attached to the tip portion of the clamp arm 330. The rotating angle label 350 is provided in the same form as the tilting angle label 150 to be provided to the tilting unit 100, and detailed description thereof will be omitted.

Figure 7:
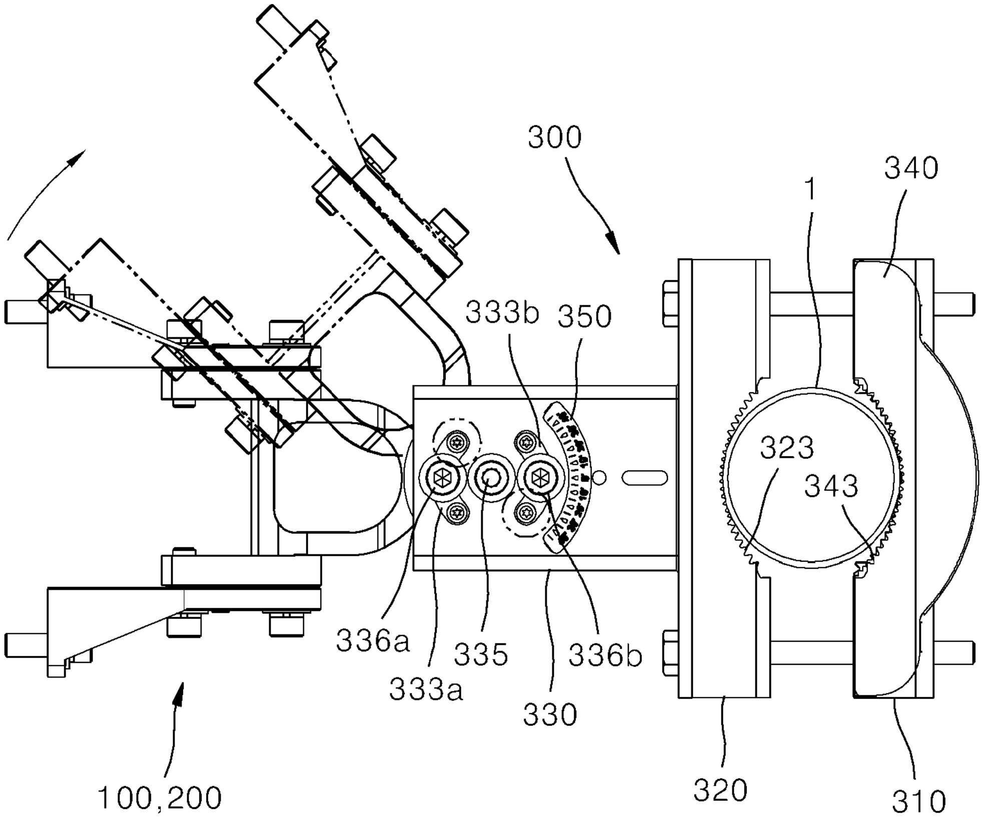
FIG. 7 is a top view of FIG. 2 which illustrates a rotating motion caused by the rotation unit.
Figure 8:
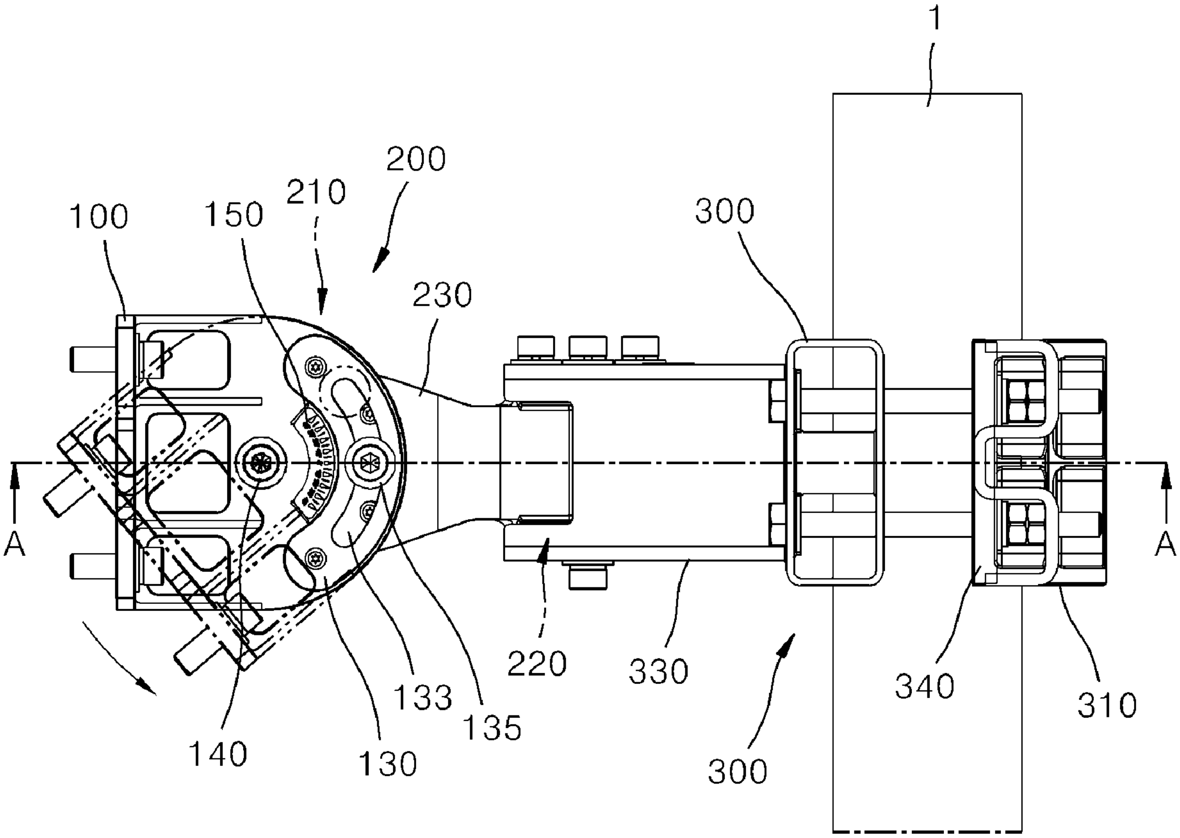
FIG. 8 is a side view of FIG. 2 which illustrates a tilting motion caused by the tilting unit.
Figure 9:
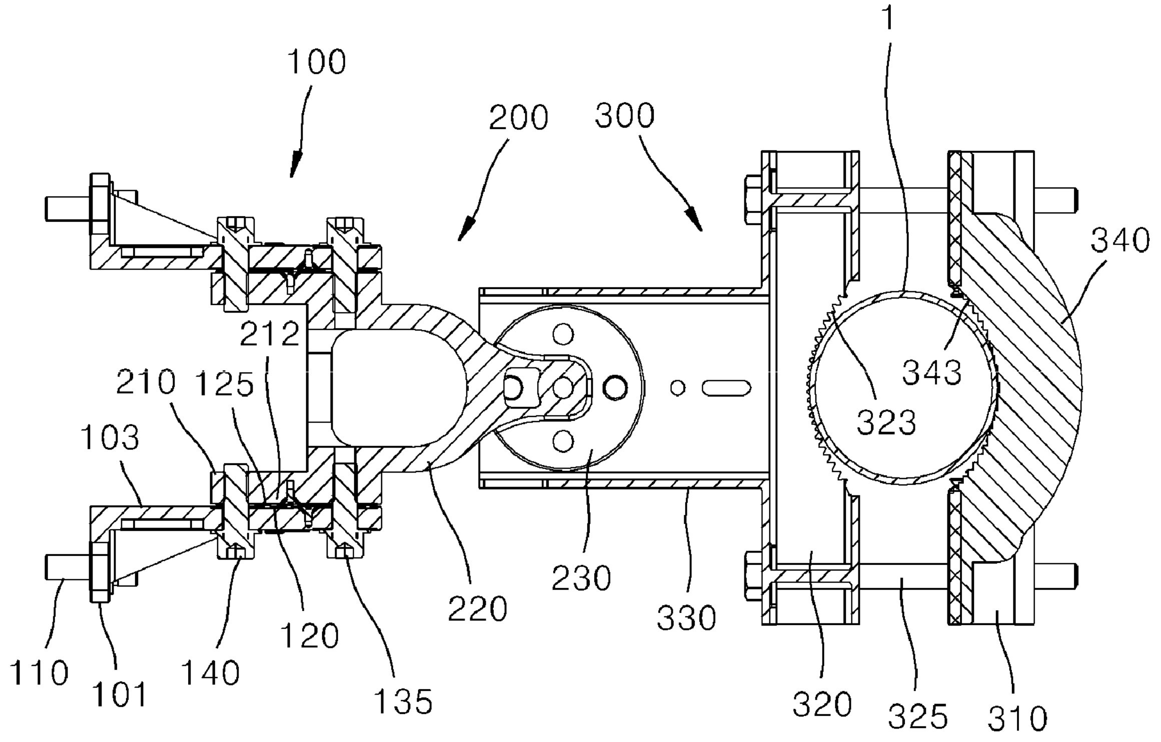
FIG. 9 is a sectional view taken along line A-A of FIG. 8.

FIG. 7 is a top view of FIG. 2 which illustrates a rotating motion caused by the rotation unit 200. FIG. 8 is a side view of FIG. 2 which illustrates a tilting motion caused by the tilting unit 100. FIG. 9 is a sectional view taken along line A-A of FIG. 8.

Referring to FIGS. 7 to 9, the rotating and tilting motions of the clamping apparatus 50 for an antenna according to an embodiment of the present disclosure will be described below in greater detail.

First, looking at the rotating motion, in a state in which the antenna device A is coupled to the tip portion of the tilting unit 100, when a predetermined external force is applied to the antenna device A or the rotation unit 200 as illustrated in FIGS. 7 and 9, the rotation unit 200 is rotated in such a way that the front rotation guide bolt 336*a* and the rear rotation guide bolt 336*b* are rotated within a range of the front guide slot 333*a* and a range of the rear guide slot 333*b* on the basis of the hinge point (see a reference numeral 335 indicating the upper rotating pin in FIG. 7) in the mounting space 331 of the clamp arm 330 of the arm unit 300.

In this case, predetermined moment based on the support pole 1 is applied to the rotation unit 200 including the antenna device A, but the outer shape-fitting recess 343 and the inner shape-fitting recess 323 formed in the arm unit 300 are formed by serration machining and are firmly coupled to the support pole 1 in close contact with the support pole 1, whereby arbitrary movement during the rotating motion can be prevented.

After a rotating angle for the antenna device A is adjusted, an arbitrary rotating motion is prevented by the rotating braking washer pad 240 provided between the arm unit 300 and the rotation unit 200, whereby reliability of work is increased.

Next, looking at the tilting motion, in a state in which the antenna device A is coupled to the tip portion of the tilting unit 100, when a predetermined external force is applied to the antenna device A or the tilting unit 100 as illustrated in FIGS. 8 and 9, the tilting unit 100 is tilted in such a way that the tilting guide bolts 135 are relatively tilted within ranges of the tilting guide slots 133 of the tilting guides 130 on the basis of the tilting pins 140. Here, it should be noted that it is described that the tilting guide bolts 135 are in a state fixed to the rotation unit 200, thus are not substantially moved, and are relatively tilted by the tilting motion of the tilting unit 100.

After a tilting angle for the antenna device A is adjusted, an arbitrary tilting motion is prevented by the tilting braking washer pads 120 provided between the rotation unit 200 and the tilting unit 100, whereby reliability of work is increased.

Figure 10:
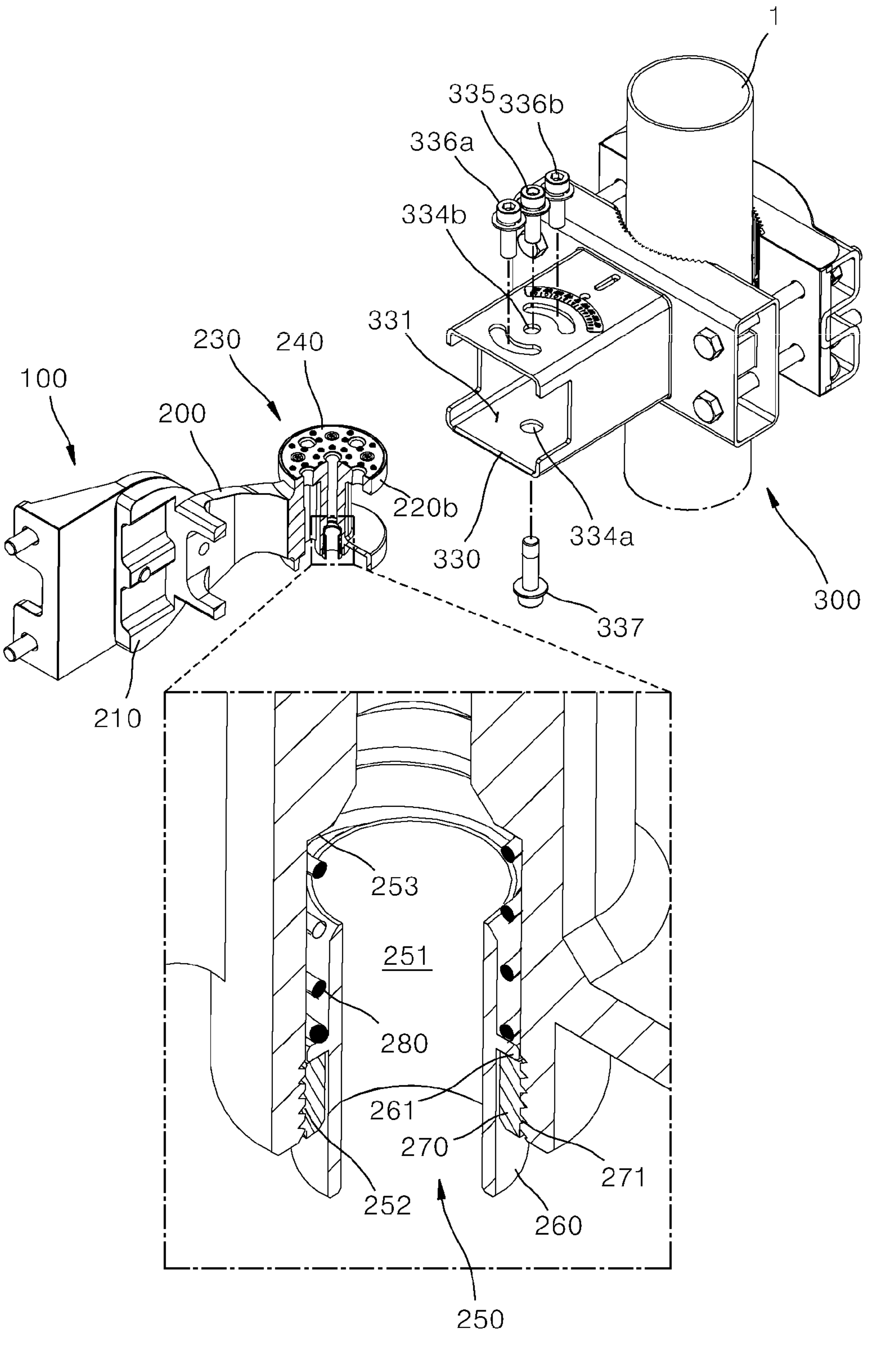
FIG. 10 is a cutaway perspective view and an enlarged view illustrating the mounting guide unit among the components of FIG. 2.

FIG. 10 is a cutaway perspective view and an enlarged view illustrating the mounting guide unit among the components of FIG. 2, and FIGS. 11A to 11C are side sectional views illustrating an operating state of the mounting guide unit of FIG. 10.

Figure 11A:
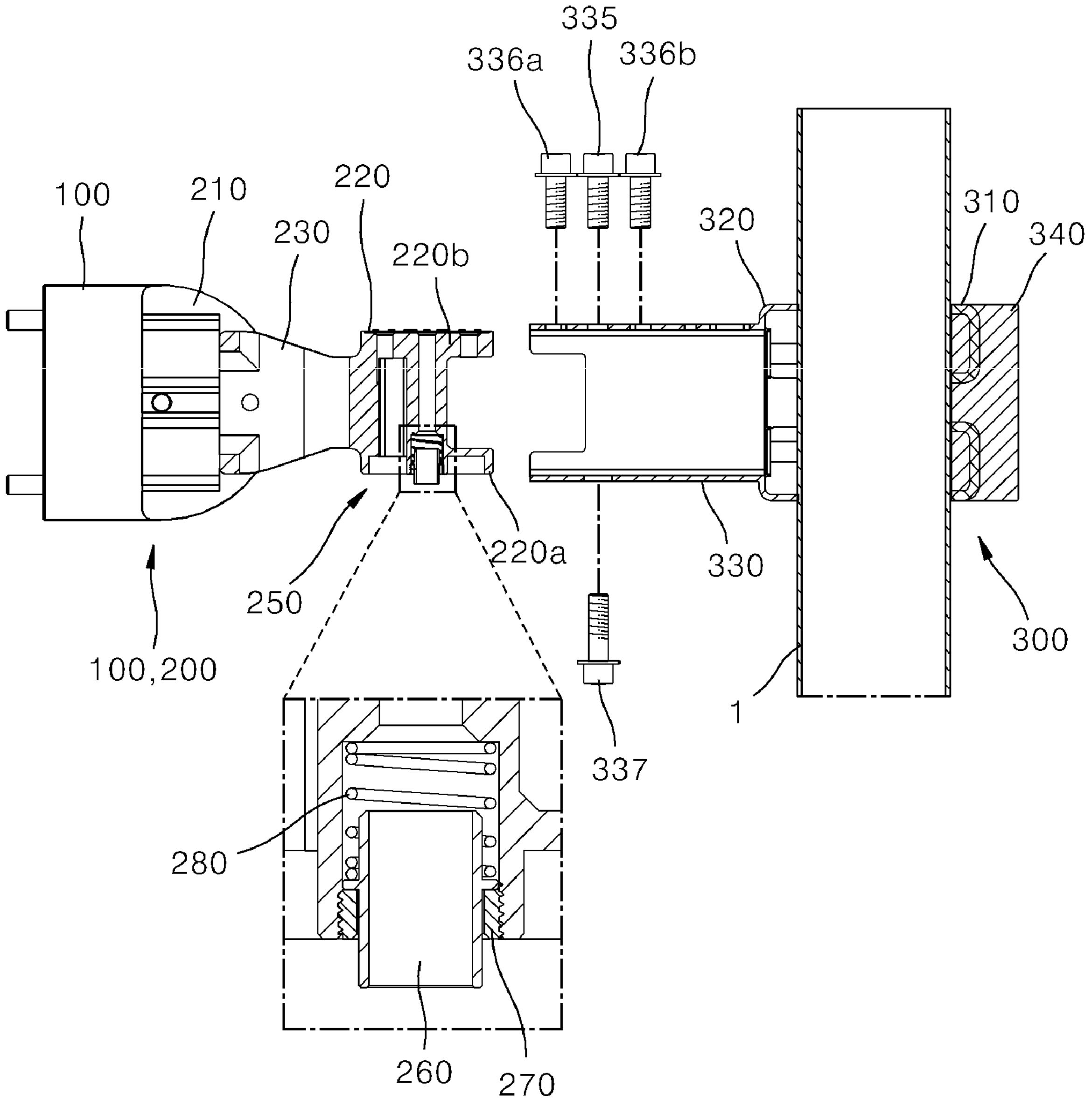
FIGS. 11A to 11C are side sectional views illustrating an operating state of the mounting guide unit of FIG. 10
Figure 11B:
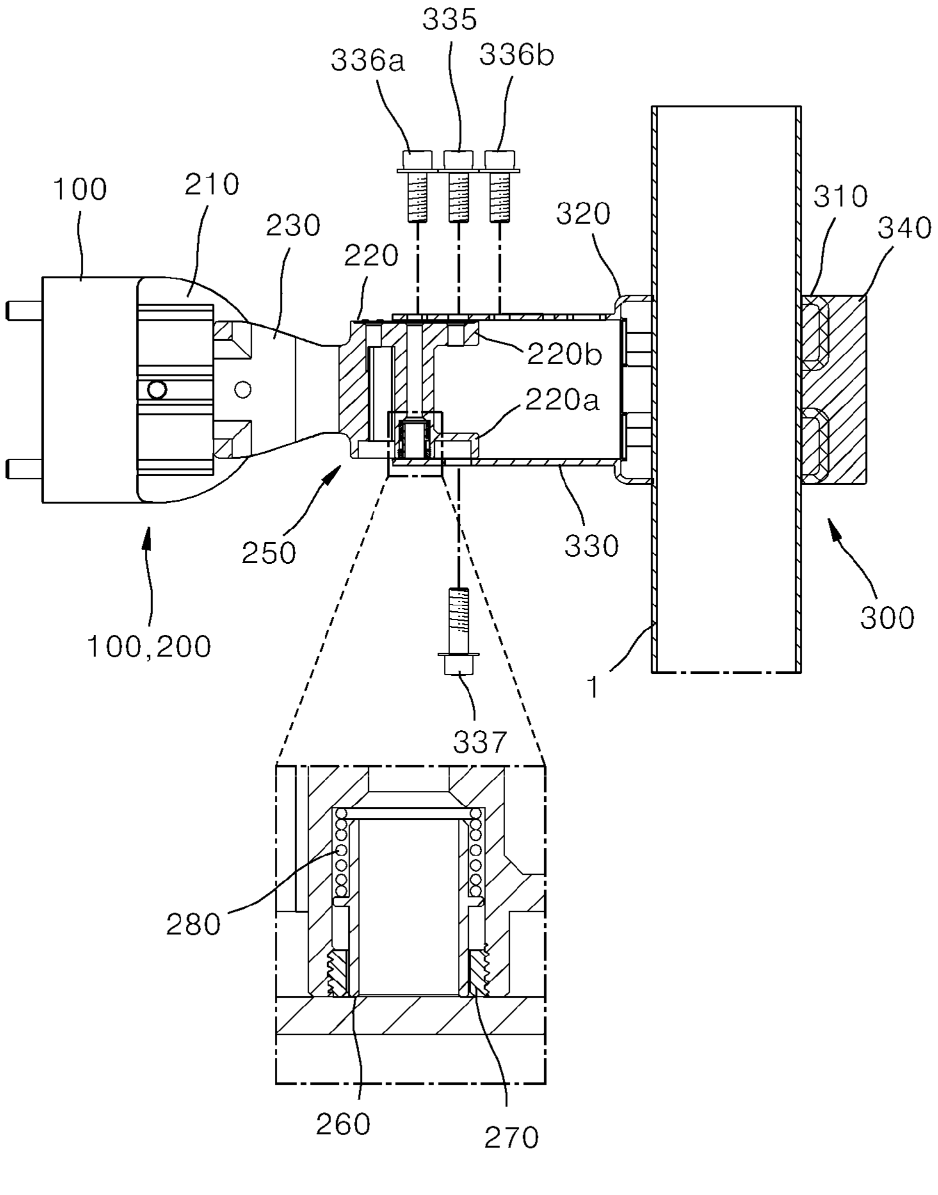
Figure 11C:
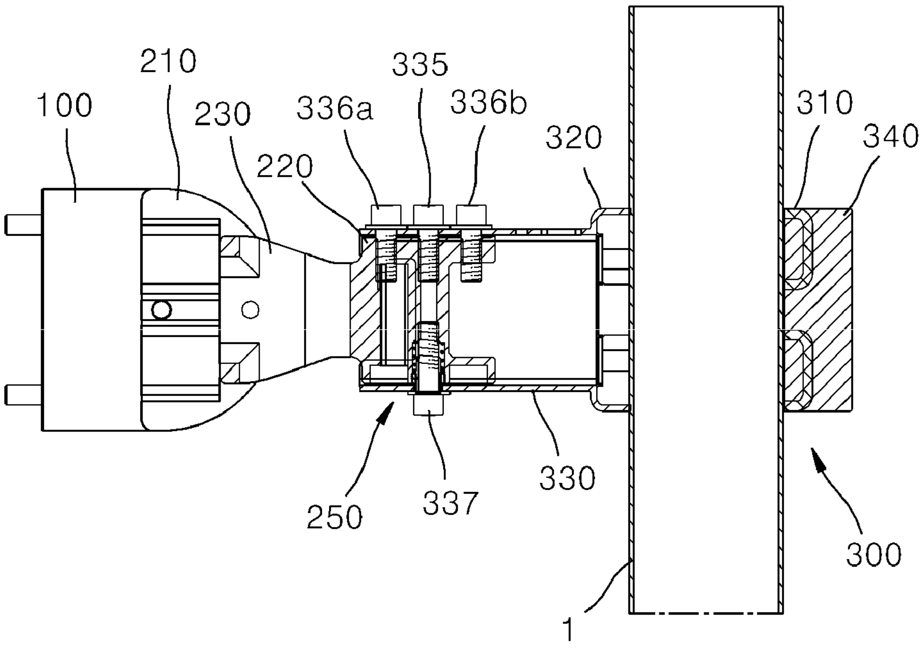

Referring to FIGS. 10 to 11C, the clamping apparatus 50 for an antenna according to an embodiment of the present disclosure may further include the mounting guide unit 250 provided to the rotation unit 200.

Referring to FIG. 10, the mounting guide unit 250 may include a guide tube 260 that is provided such that an outer end thereof can protrude outward from the lower hinge fastening hole 251, which is provided such that a part of the rotation unit 200 which corresponds to a hinge point in the mounting space 331 is recessed upward, at a predetermined length, and an elastic body 280 that elastically supports the guide tube 260 in an outward direction of the rotation unit 200.

Here, the mounting guide unit 250 may be provided to the lower hinge fastening hole 251 formed in the lower block 220*a* of the rotation unit 200. In addition, the elastic body 280 may be provided as a coil spring that is interposed between an outer circumferential surface of the guide tube 260 and an inner circumferential surface of the lower hinge fastening hole 251.

Internal threads 252 are formed on an inner circumferential surface (i.e. an inner circumferential surface adjacent to the outside) of a lower end of the lower hinge fastening hole 251. The mounting guide unit 250 may further include an anti-separation nut 270 that is screwed to the internal threads 252 formed in the inner circumferential surface of the lower hinge fastening hole 251 so as to prevent outward separation of the guide tube 260.

This anti-separation nut 270 is located between the outer circumferential surface of the guide tube 260 and the inner circumferential surface of the lower hinge fastening hole 251, and a hanging rib 261 hung on the anti-separation nut 270 may be formed radially outward on the outer circumferential surface of the guide tube 260 so as to extend in a circumferential direction. One end of the elastic body 280 interposed between the outer circumferential surface of the guide tube 260 and the inner circumferential surface of the lower hinge fastening hole 251 may be fixedly supported on an upper side of the hanging rib 261.

An outer end of the guide tube 260 may protrude at a length at which the guide tube 260 can be inserted into and caught in the hinge hole (i.e., the lower hinge hole 334*a*) formed at the hinge point in the mounting space 331 of the arm unit 300.

Referring to FIG. 11A, the mounting guide unit 250 provided in this way is illustrated before the tilting unit 100 to which the antenna device A is coupled and the rotation unit 200 are mounted on the arm unit 300, and the guide tube 260 maintains a state protruding outward from the lower hinge fastening hole 251 at a predetermined length.

Next, referring to FIG. 11B, the mounting guide unit 250 is inserted into a lower surface of a work space after a worker arbitrarily pushes the guide tube 260 into the lower hinge fastening hole 251 in order to insert and install the rotating block 220 of the rotation unit 200 into and in the mounting space 331.

Finally, if the worker continuously inserts the tilting unit 100 to which the antenna device A is coupled and the rotation unit 200 into the mounting space 331, the guide tube 260 is inserted into the lower hinge hole 334*a* by an elastic force of the elastic body 280 at a side where the lower hinge hole 334*a* is located, whereby temporary fixing is completed. Assembly work may be completed by a process of causing the lower rotating pin 337 to pass through the lower hinge hole 334*a* from the outside and to be fastened to the lower hinge fastening hole 251.

In this way, the clamping apparatus 50 for an antenna according to an embodiment of the present disclosure can greatly improve work performance in the field by coupling the antenna device A provided as a somewhat large weight body to the tilting unit 100 to which the antenna device A is coupled, and by coupling the rotation unit 200 to the arm unit 300 through the mounting guide unit 250 by a one-touch coupling method.

Figure 12:
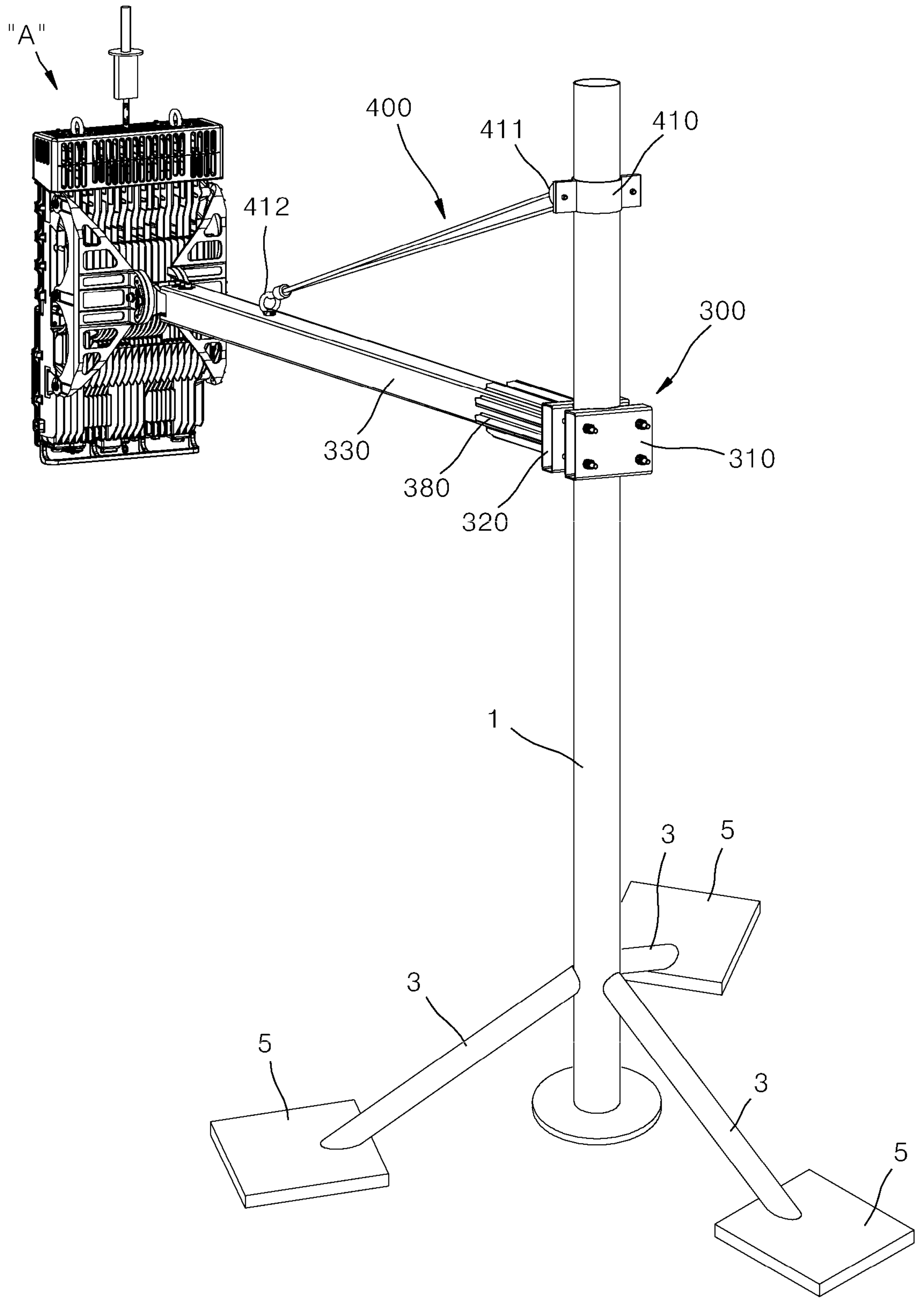
FIG. 12 is a perspective view illustrating an example of an installed state of the antenna device, as a modification of the arm unit and the tilting unit among the components of an embodiment of the clamping apparatus for an antenna according to the present disclosure.
Figure 13:
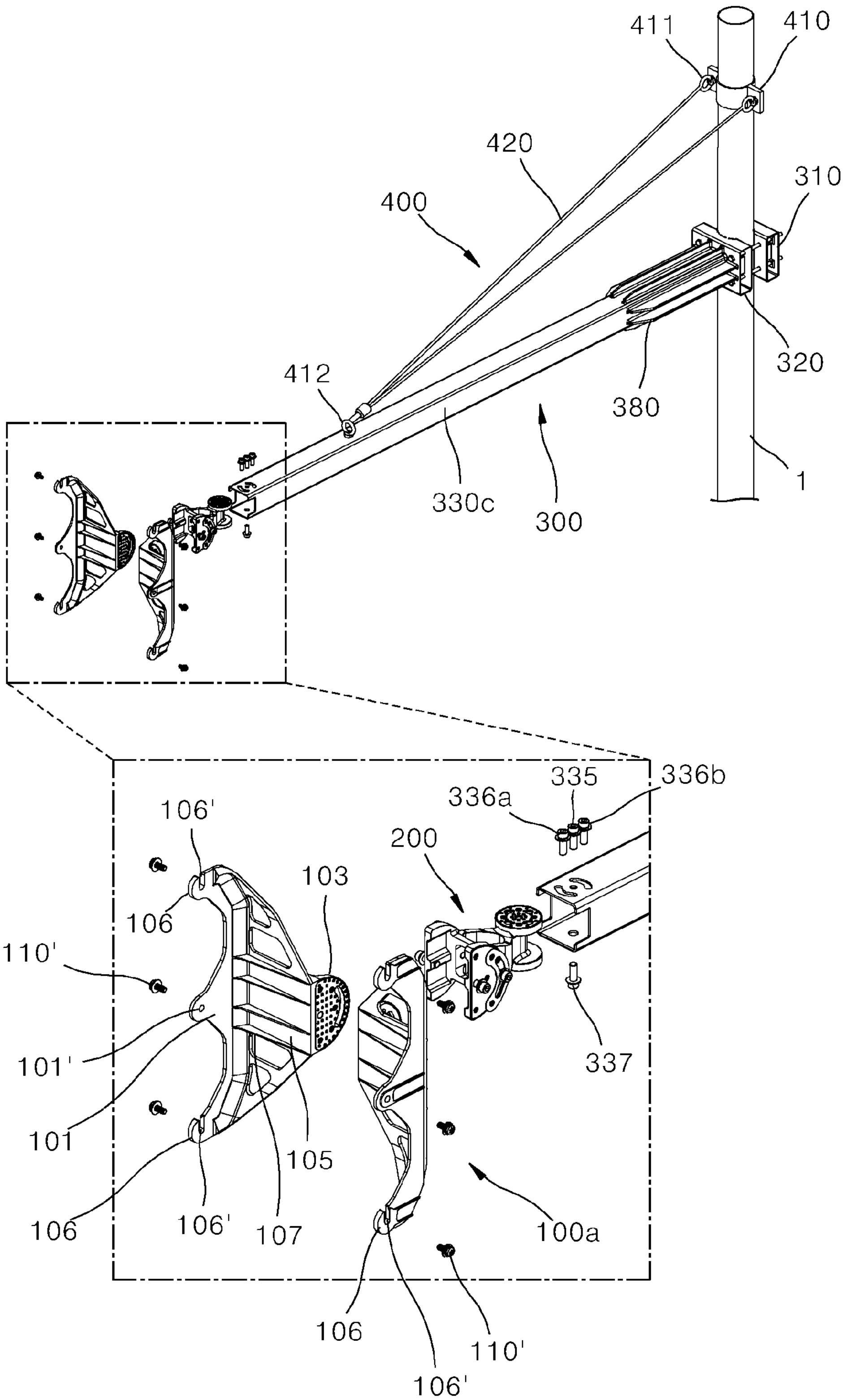
FIG. 13 is an exploded perspective view of FIG. 12.
Figure 14A:
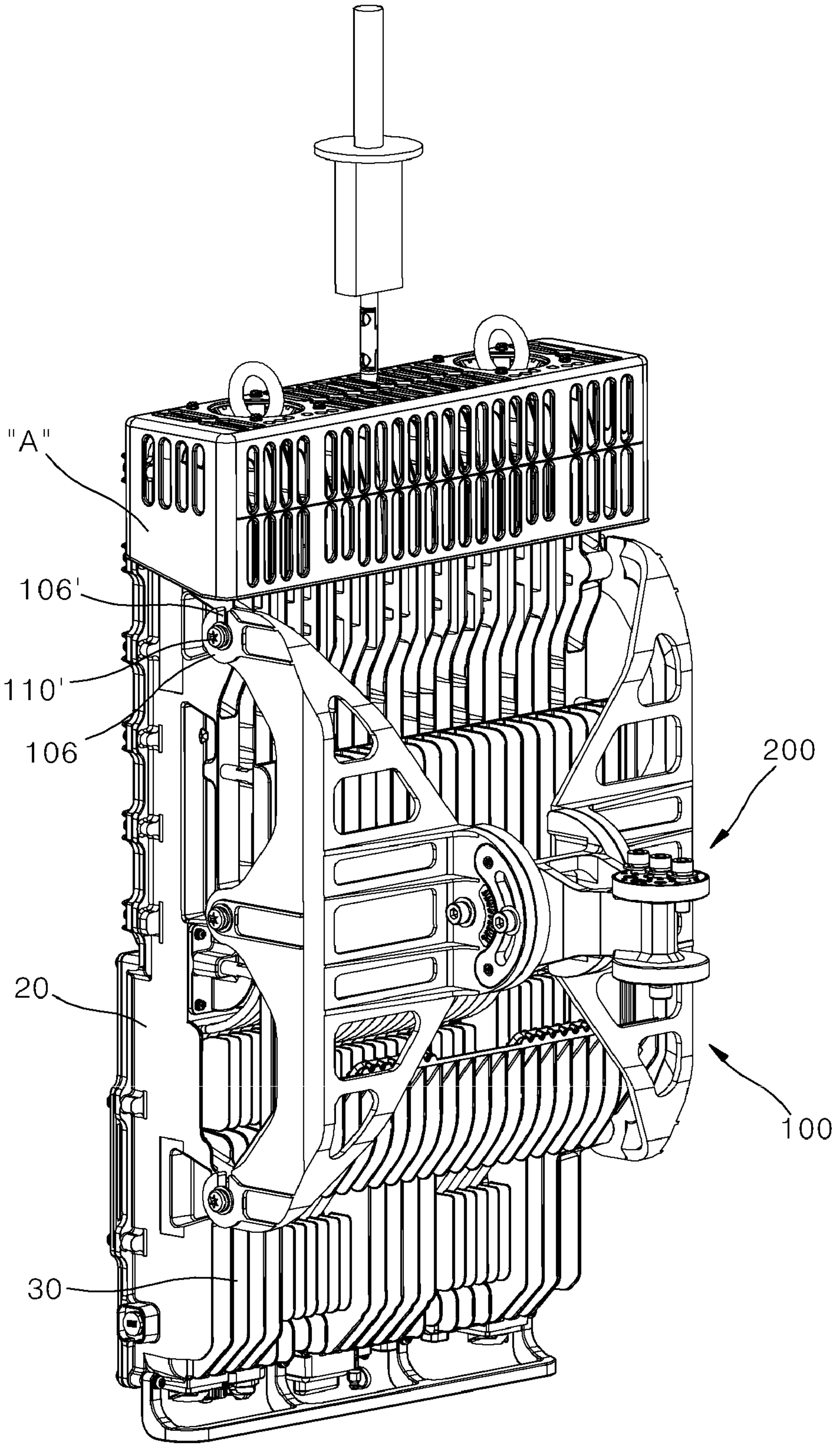
FIGS. 14A and 14B are a perspective view and an exploded perspective view illustrating a state in which the antenna device is installed on the tilting unit of FIG. 12.
Figure 14B:
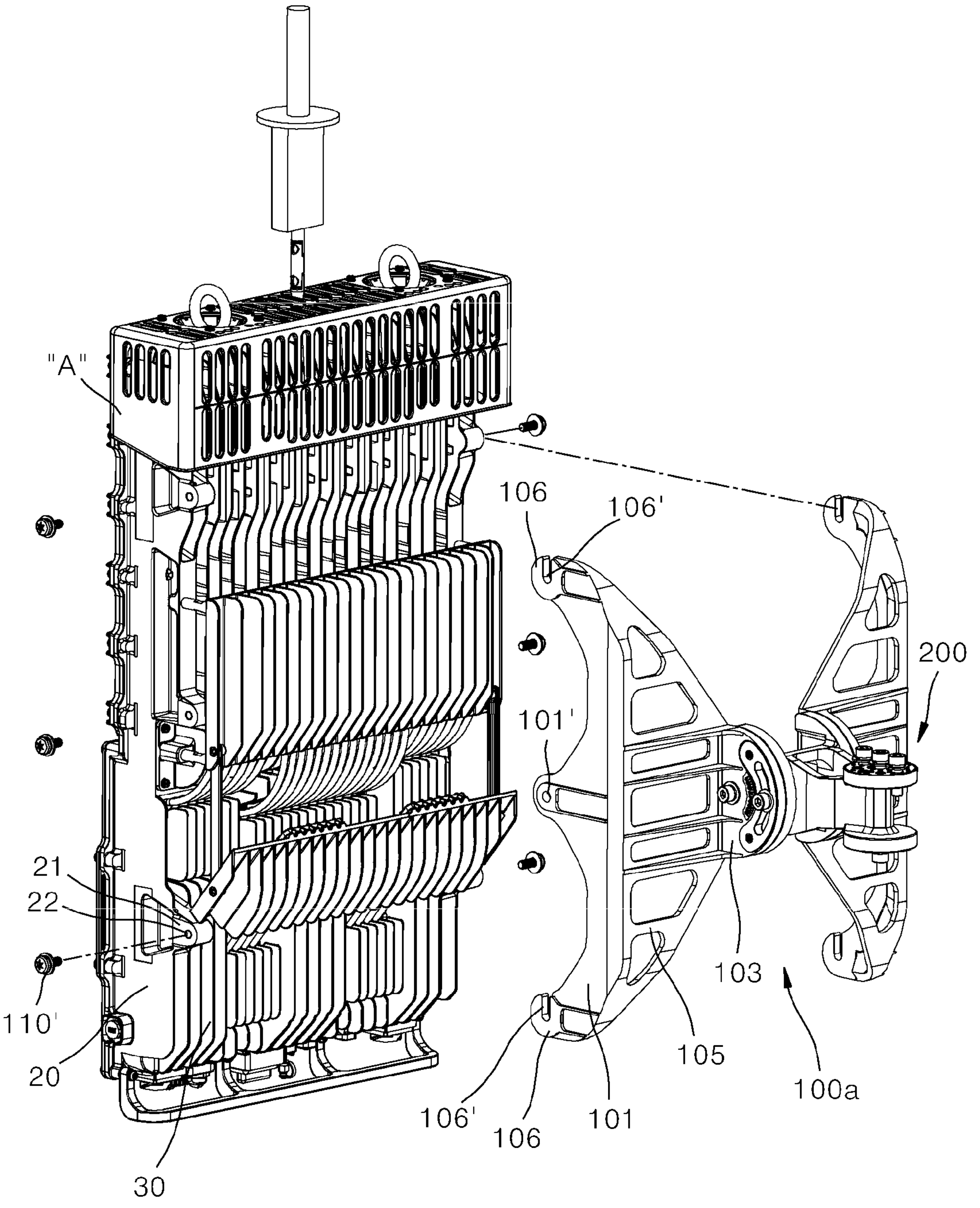

FIG. 12 is a perspective view illustrating an example of an installed state of the antenna device, as a modification of the arm unit and the tilting unit among the components of an embodiment of the clamping apparatus 50 for an antenna according to the present disclosure. FIG. 13 is an exploded perspective view of FIG. 12. FIGS. 14A and 14B are a perspective view and an exploded perspective view illustrating a state in which the antenna device is installed on the tilting unit of FIG. 12.

Referring to FIGS. 12 to 14B, the tilting unit 100 on which the antenna device A is substantially installed may further include an expansion connector 105 that is expanded to connect the antenna coupling stage 101 and the tilting block 103 in a left-right direction.

When a vertical length of the antenna device A is relatively larger, the expansion connector 105 is an additional component for improving a coupling force with respect to the antenna device A. That is, as a difference from the tilting unit 100 illustrated in FIGS. 1 to 11C, the tilting unit 100 illustrated in FIGS. 12 to 14B may have an additional advantage in that fastening points can be formed at multiple parts of the antenna device A, the vertical length of which is formed relatively long.

The expansion connector 105 is bent to have surfaces orthogonal to the antenna coupling stage 101 and the tilting block 103, and may include multiple reinforcement ribs 107 that are additionally formed in the front in order to reinforce mechanical fatigue strength with respect to the weight of the antenna device A.

Meanwhile, referring to FIGS. 13 to 14B, the antenna coupling stage 101 may have at least two or more fastening flanges 106 in which U-shaped fastening holes 106' having open upper sides are formed such that fixing screws 110', which are previously fastened to a plurality of places 21 of lateral surfaces of the antenna device A in a temporarily fixed form, are hung downward and then screwed.

In FIG. 13 illustrated as a modification of the tilting unit 100, the fastening flanges 106 are provided at left upper and lower ends and right upper and lower ends of the antenna coupling stages 101 so as to be spaced apart from each other, and fastening flanges (not indicated by a reference numeral), in which ordinary fastening holes 101' different from the U-shaped fastening holes 106' are formed in left and right middle parts of the antenna coupling stages 101, are provided, so that the antenna coupling stages 101 can be provided to be coupled with the antenna device A in a total of six places.

Here, referring to FIG. 14B, the antenna coupling stages 101 of the tilting unit 100 are moved from below to above the fixing screws 110' that are previously fastened to screwing holes 22 formed in the plurality of places 21 of the lateral surfaces of the antenna device A in a temporarily fixed form, and the fixed fixing screws 110' are hung on the U-shaped fastening holes 106' of the antenna coupling stages 101, and can be turned and firmly fixed.

In this way, the expansion connectors 105 provide an advantage in that they are fixed to the screwing holes 22 provided adjacent to ends of the antenna device A and thus the antenna device A in which a left-right width or an up-down length thereof is formed long on the whole can be stably installed in equilibrium.

Meanwhile, referring to FIGS. 1 and 12, the support pole 1 may be provided with multiple support rods 3 that slantly extend downward from an outer circumferential surface of the support pole 1 and are radially spaced apart from one another at a predetermined angle, and supporting panels 5 that are provided at tips of the multiple support rods 3 and are supported and coupled to a ground or a wall.

The multiple support rods 3 may be fixed to the support pole 1 by welding and be formed integrally with the support pole 1, as well as the multiple support rods 3 may be separately manufactured to be coupled to the support pole 1 by various coupling methods such as a bolting method.

Further, the supporting panels 5 may include bolt fastening holes (not illustrated) that are coupled to the ground or the wall using fastening members such as bolts.

Figure 15:
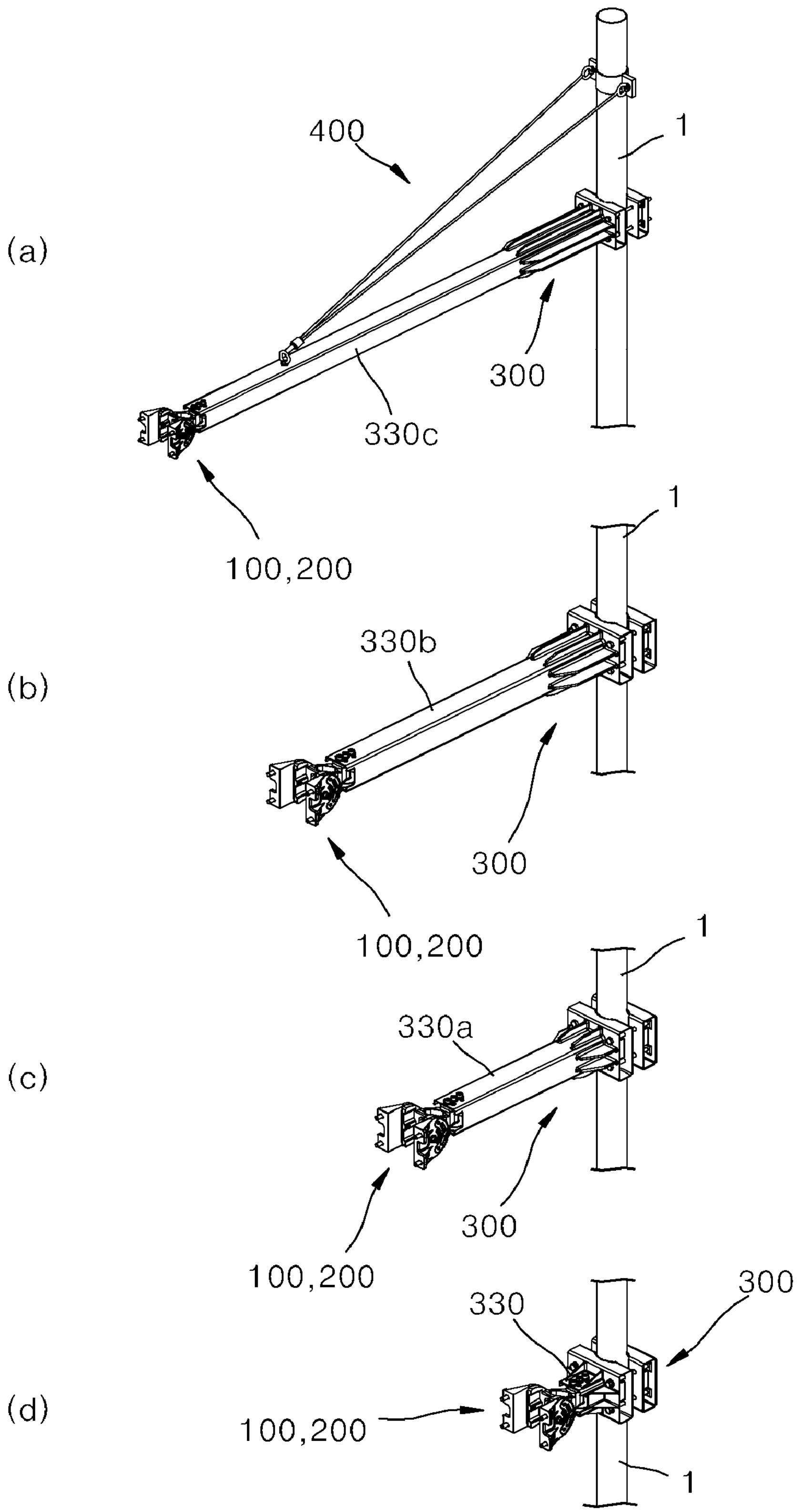
FIG. 15 is a perspective view illustrating various embodiments of the arm unit among the components of FIG. 2.

FIG. 15 is a perspective view illustrating various embodiments of the arm unit among the components of FIG. 2.

Referring to FIG. 15, in an embodiment of the clamping apparatus 50 for an antenna according to the present disclosure, the arm unit 300 may be manufactured at various lengths such that a separation distance between the support pole 1 and the antenna device A differs.

Here, as the length of the arm unit 300 becomes relatively longer, fatigue strength caused by the weight of the antenna device A coupled to the tip portion of the tilting unit 100 and the length of the arm unit 300 itself is taken into consideration, and it goes without saying that, as described above, the reinforcement ribs 380 and the reinforcement wire unit 400 can be selectively provided.

More specifically, referring to FIG. 15, when the length of the clamp arm 330 is formed relatively long, and when fatigue strength of the connection part between the inner mounting block 320 and the clamp arm 330 depending on the weight of the antenna device A coupled to the tilting unit 100 and the length of the clamp arm 330 is not satisfied only by the formation of the at least one or more above-described reinforcement ribs 380, the clamping apparatus 50 for an antenna according to an embodiment of the present disclosure may further include the reinforcement wire unit 400 for reinforcing this.

The reinforcement wire unit 400 may provided with a connecting wire 420, one end of which is fixed to a part of the support pole 1 which corresponds to an upper portion of the arm unit 300, and the other end of which is fixed to the clamp arm 330 of the arm unit 300. An installing bracket 410 and a one-side connecting ring 411 for connecting the one end of the connecting wire 420 may be provided to the part of the support pole 1, and the other-side connecting ring 412 for connecting the other end of the connecting wire 420 may be provided to the tip portion of the clamp arm 330 of the arm unit 300.

As described above, this reinforcement wire unit 400 may be selectively installed in consideration of the fatigue strength of the connection part between the inner mounting block 320 and the clamp arm 330 depending on the length of the clamp arm 330 manufactured to have various lengths and the weight of the antenna device A coupled to the tilting unit 100.

An embodiment of the clamping apparatus 50 for an antenna according to the present disclosure includes the clamp arm 330 as one component of the arm unit 300 so as to have various lengths, thereby providing an advantage that causes installation work to be more easily completed while removing spatial limitations on multiple antenna devices A (regardless of whether or not they are antenna devices of the same communication company) installed on one support pole 1.

An embodiment of the clamping apparatus for an antenna according to the present disclosure has been described in detail with reference to the accompanying drawings. However, it goes without saying that embodiments of the present disclosure are not necessarily restricted by the embodiment described above and can be modified and carried out in an equivalent range by those skilled in the art to which the present disclosure pertains. Therefore, the scope of rights of the present disclosure will be defined by the following claims.

INDUSTRIAL APPLICABILITY

The present disclosure provides the clamping apparatus for an antenna which can increase a degree of freedom of installation with respect to a support pole having many spatial limitations and improve workability.

The invention claimed is:

1. A clamping apparatus for an antenna comprising:

an arm unit that coupled to a support pole and has a mounting space formed in a tip portion thereof so as to open in a longitudinal direction;

a rotation unit that is detachably mounted in the mounting space of the arm unit and has a tip portion coupled to be rotatable about a hinge point in the mounting space at a predetermined angle in a left-right direction;

a tilting unit which is coupled to the tip portion of the rotation unit so as to be tiltable in an up-down direction and configured to mediate coupling of an antenna device; and a mounting guide unit that is provided to the rotation unit, and is elastically pressed, and then is temporarily fixed to the hinge point in the mounting space when the rotation unit is mounted in the mounting space of the arm unit.

2. The clamping apparatus for an antenna according to claim 1, wherein the mounting guide unit comprises:

a guide tube that is provided such that an outer end thereof is protrudable outward from a lower hinge fastening hole, which is provided such that a part of the rotation unit which corresponds to the hinge point in the mounting space is recessed, at a predetermined length; and an elastic body that elastically supports the guide tube in an outward direction of the rotation unit.

3. The clamping apparatus for an antenna according to claim 2, wherein an outer end of the guide tube protrudes at a length at which the guide tube is inserted into and caught in a hinge hole formed at the hinge point in the mounting space of the arm unit.

4. The clamping apparatus for an antenna according to claim 2, wherein a lower rotating pin passes through the hinge point at an outer side of the arm unit and is inserted into and installed in the guide tube.

5. The clamping apparatus for an antenna according to claim 2, wherein the mounting guide unit further comprises an anti-separation nut that is screwed to an inner circumferential surface of the lower hinge fastening hole so as to prevent outward separation of the guide tube.

6. The clamping apparatus for an antenna according to claim 5, wherein:

the anti-separation nut is located between an outer circumferential surface of the guide tube and the inner circumferential surface of the lower hinge fastening hole; and a hanging rib hung on the anti-separation nut is formed radially outward on the outer circumferential surface of the guide tube so as to extend in a circumferential direction.

7. The clamping apparatus for an antenna according to claim 1, wherein the arm unit comprises:

an outer mounting block that is disposed to come into close contact with one side of an outer circumferential surface of the support pole;

an inner mounting block that is disposed to come into close contact with the other side of the outer circumferential surface of the support pole and is fixed with the outer mounting block by at least one or more fixing bolts; and a clamp arm that extends from the inner mounting block at a predetermined length in a direction orthogonal to the support pole and constitutes a tip portion to which the mounting space is provided.

8. The clamping apparatus for an antenna according to claim 7, wherein at least one or more reinforcement ribs are formed at a connection part between the inner mounting block and the clamp arm.

9. The clamping apparatus for an antenna according to claim 7, wherein the clamp arm is manufactured at multiple preset lengths so as to be installable in a different separation distance from the support pole depending on another antenna device, which is installed adjacent to the antenna device coupled to the tilting unit, and surrounding interference bodies.

10. The clamping apparatus for an antenna according to claim 7, further comprises a reinforcement wire unit having a connecting wire, one end of which is fixed to a part of the support pole which corresponds to an upper portion of the arm unit, and the other end of which is fixed to the clamp arm of the arm unit.

11. The clamping apparatus for an antenna according to claim 10, wherein the reinforcement wire unit is selectively installed in consideration of fatigue strength of a connection part between the inner mounting block and the clamp arm depending on weight of the antenna device coupled to the tilting unit and a length of the clamp arm.

12. The clamping apparatus for an antenna according to claim 7, wherein at least one rotation guide part is formed at a tip portion of the clamp arm, to which the mounting space is provided, in a slot hole shape so as to guide a rotating motion of the rotation unit.

13. The clamping apparatus for an antenna according to claim 12, wherein the rotation guide part comprises:

at least one rotation guide slot that is formed in a circumference having a common center with the hinge point; and a rotation guide bolt that passes through the at least one rotation guide slot from an outside and is fixed to the rotation unit.

14. The clamping apparatus for an antenna according to claim 13, wherein a rotating angle label, which indicates a position of the rotation guide bolt moved in the rotation guide slot from a reference point at an angle, is attached to the tip portion of the clamp arm.

15. The clamping apparatus for an antenna according to claim 1, wherein the rotation unit comprises:

tilting unit installing stages to which the tilting unit is tiltably coupled;

a rotating block that is inserted into the mounting space of the arm unit; and a connecting block that interconnects the tilting unit installing stages and the rotating block.

16. The clamping apparatus for an antenna according to claim 15, wherein:

A rotating braking washer pad is interposed between the rotating block and the arm unit; and tilting braking washer pads are interposed between the tilting unit installing stages and the tilting unit.

17. The clamping apparatus for an antenna according to claim 16, wherein:

a rotating braking washer pad mounting recess to which the rotating braking washer pad is coupled in a corresponding shape is formed in an upper surface of the rotating block; and tilting braking washer pad mounting recesses to which the tilting braking washer pads are coupled in a corresponding shape are formed in inner lateral surfaces of the tilting unit installing stages.

18. The clamping apparatus for an antenna according to claim 16, wherein a plurality of braking protrusions are formed to protrude from an upper surface of the rotating braking washer pad and inner lateral surfaces of the tilting braking washer pads.

19. The clamping apparatus for an antenna according to claim 15, wherein:

the tilting unit installing stages are provided apart from each other in a pair so as to extend from left and right ends of the connecting block toward the tilting unit; and tilting pins becoming a tilting center of the tilting unit are provided in outer lateral surfaces of the tilting unit installing stages so as to be connected with the tilting unit.

20. The clamping apparatus for an antenna according to claim 1, wherein:

the tilting unit comprises:

antenna coupling stages that are coupled with the antenna device; and tilting blocks that are coupled to come into surface contact with one outer lateral surface and the other outer lateral surface of the rotation unit; and tilting guides are formed in a slot hole shape and are attached to the tilting blocks so as to guide a tilting motion of the tilting unit.

21. The clamping apparatus for an antenna according to claim 20, wherein:

the tilting blocks are tilted about tilting pins that are provided to outer lateral surfaces of tilting unit installing stages of the rotation unit so as to become a tilting center of the tilting unit; and the tilting guides comprise:

tilting guide slots that are formed on circumferences having common centers with the tilting pins; and tilting guide bolts that pass through the tilting guide slots from an outside and are fixed to the rotation unit.

22. The clamping apparatus for an antenna according to claim 21, wherein a tilting angle label, which indicates a position of each of the tilting guide bolts moved in each of the tilting guide slots from a reference point at an angle, is attached to an outer lateral surface of each of the tilting blocks.

23. The clamping apparatus for an antenna according to claim 20, wherein the tilting unit further includes an expansion connector that is expanded to connect the antenna coupling stage and the tilting block in a left-right direction.

24. The clamping apparatus for an antenna according to claim 23, wherein each of the antenna coupling stages comes into surface contact with a plurality of places of any one of a rear surface and a lateral surface of the antenna device, and is fastened and fixed to fastening holes formed in the plurality of places of any one of the rear surface and the lateral surface of the antenna device via fastening means.

25. The clamping apparatus for an antenna according to claim 23, wherein each of the antenna coupling stages has at least two or more fastening flanges, in each of which a U-shaped fastening hole having an open upper side is formed, such that fixing screws, which are previously fastened to a plurality of places of a lateral surface of the antenna device in a temporarily fixed form, are hung downward and then screwed.

26. The clamping apparatus for an antenna according to claim 1, wherein the support pole comprises:

multiple support rods that slantly extend downward from an outer circumferential surface of the support pole and are radially spaced apart from one another at a predetermined angle; and supporting panels that are provided at tips of the multiple support rods and are supported and coupled to a ground or a wall.

* * * * *